US012777058B2

(12) United States Patent
Amini et al.

(10) Patent No.: US 12,777,058 B2
(45) Date of Patent: Oct. 27, 2026

(54) ADAPTIVE NETWORK TRAFFIC CLASSIFICATION

(71) Applicant: Cisco Technology, Inc., San Jose, CA (US)

(72) Inventors: Peiman Amini, Fremont, CA (US); Niloo Bahadori, Greensboro, NC (US); Jerome Henry, Pittsboro, NC (US); Bahador Amiri, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

(21) Appl. No.: 19/051,098

(22) Filed: Feb. 11, 2025

(65) Prior Publication Data

US 2025/0317458 A1 Oct. 9, 2025

Related U.S. Application Data

(60) Provisional application No. 63/574,178, filed on Apr. 3, 2024.

(51) Int. Cl.
*H04L 9/40* (2022.01)
*H04L 47/2475* (2022.01)
*H04L 47/34* (2022.01)

(52) U.S. Cl.
CPC ...... *H04L 63/1425* (2013.01); *H04L 47/2475* (2013.01); *H04L 47/34* (2013.01);
(Continued)

(58) Field of Classification Search
None
See application file for complete search history.

(56) References Cited

U.S. PATENT DOCUMENTS 11,038,906 B1 * 6/2021 Bingham ............ H04L 63/1425
2016/0359740 A1 12/2016 Parandehgheibi et al.
(Continued)

FOREIGN PATENT DOCUMENTS

CN 114048799 A 2/2022
CN 117014198 A * 11/2023 ......... H04L 63/1425
(Continued)

OTHER PUBLICATIONS

Thuy T.T. Nguyen and Grenville Armitage (A Survey of Techniques for Internet Traffic Classification using Machine Learning); pp. 21; Published on IEEE (Year: 2008).*
(Continued)

*Primary Examiner* — Ali H. Cheema
(74) *Attorney, Agent, or Firm* — Rutan & Tucker, LLP; Ravi Mohan; Marc A. McClain

(57) ABSTRACT

Devices and methods for adaptively classifying network traffic associated with a new application are provided. A network device, for example, an edge device, stores a Machine Learning (ML) model pre-trained based on historical network traffic associated with a set of applications. The network device receives network traffic associated with a new application, for example, a zero-day application, that is different from the set of applications. The ML model learns one or more patterns associated with the received network traffic. The ML model detects whether the learned pattern(s) is similar to previously learned patterns of at least one application. The ML model classifies the received network traffic as legitimate traffic or anomalous traffic based on the detection. The ML model is scalable, providing timely classifications for different types of network traffic, while handling protocol and application diversity, variability in traffic patterns, and emergence of zero-day application traffic.

17 Claims, 10 Drawing Sheets

(52) U.S. Cl.
CPC ...... *H04L 63/0263* (2013.01); *H04L 63/1416* (2013.01); *H04L 63/145* (2013.01)

(56) References Cited

U.S. PATENT DOCUMENTS

| | | | | |
|---|---|---|---|---|
| 2021/0203565 | A1* | 7/2021 | Arora | G06N 5/04 |
| 2021/0303984 | A1 | 9/2021 | Lan et al. | |
| 2023/0069731 | A1* | 3/2023 | Chen | H04L 63/0263 |
| 2023/0164043 | A1 | 5/2023 | Sirov et al. | |
| 2024/0080511 | A1* | 3/2024 | Ding | H04N 21/251 |
| 2024/0137375 | A1* | 4/2024 | Srivatsa | H04L 41/142 |
| 2024/0244070 | A1 | 7/2024 | Mohapatra et al. | |
| 2025/0202940 | A1* | 6/2025 | Bhat | H04L 63/0227 |
| 2025/0233877 | A1* | 7/2025 | Yu | H04L 41/16 |

FOREIGN PATENT DOCUMENTS

| | | | | |
|---|---|---|---|---|
| CN | 117034112 | A | | 11/2023 |
| CN | 117633627 | A | | 3/2024 |
| JP | 2005018338 | A | * | 1/2005 |
| WO | 2024180543 | A1 | | 9/2024 |

OTHER PUBLICATIONS

Luis Alfredo Alvarez Almeida (Data Model Classication Based on Machine Learning Techniques for Detection of Anomalous Traffic) ; pp. 90; Published in (Year: 2019).*

International Search Report and Written Opinion for International Application No. PCT/US2025/022821, mailed May 23, 2025, 15 Pages.

* cited by examiner

ADAPTIVE NETWORK TRAFFIC CLASSIFICATION

CROSS-REFERENCE TO RELATED APPLICATIONS

This application claims the benefit of priority to U.S. Provisional Application No. 63/574,178, filed Apr. 3, 2024, the entirety of which is incorporated herein by reference.

FIELD

The present disclosure relates to network security and management. More particularly, the present disclosure relates to adaptively classifying network traffic associated with a new application.

BACKGROUND

With the exponential growth of digital technologies and increasing dependence on interconnected networks, the need for robust network security is becoming more important over time. Most organizations are heavily dependent on their network infrastructure to conduct business, communicate with clients and partners, and store sensitive information. Consequently, protection of networked systems from unauthorized access, disruption, and data breaches has become a top priority. Network security may aim to protect integrity, confidentiality, and availability of data and resources on a network, thereby safeguarding an organization's data, systems, and resources against threats, unauthorized access, data breaches, attacks, malware, damage, and system vulnerabilities. Network security may involve implementing security policies and deploying network software and hardware to protect the network, its infrastructure, and all its traffic from external cyberattacks and protect all assets and resources available via the network from unauthorized access. Many industries may require monitoring of the network traffic to ensure compliance with the security policies and regulations.

In the field of network security and management, accurate classification of network traffic may be paramount to ensuring efficient network operation and security. One of the challenges in securing a network may lie in distinguishing between legitimate network traffic and anomalous network traffic. Data and requests that are part of regular operations, including user communications, data transfers, and system processes may constitute legitimate network traffic. Anomalous network traffic, on the other hand, may include, for example, any traffic that deviates from established patterns, which may indicate malicious activities such as Distributed Denial-of-Service (DDoS) attacks, unauthorized data access, malware infections, or system intrusions. Early detection of anomalous traffic may allow security teams to execute proactive measures such as blocking malicious sources, adjusting firewall rules, or implementing new security protocols, to prevent attacks from escalating. By classifying the network traffic, organizations can identify potential breaches or violations that may affect their compliance status.

However, the classification process may be complicated by several challenges that evolve with the changing landscape of Internet usage and the continuous development of new applications. For example, the diversity of protocols and applications, coupled with frequent updates and the emergence of new software, can create a constantly changing network traffic profile. Moreover, rapid changes in network traffic patterns due to factors such as new user behavior, network policies, software updates, or the like can reduce the accuracy of conventional classification systems. Furthermore, conventional classification systems often rely on previously observed network data or predefined signatures, which makes them unable to recognize new or unseen network traffic patterns generated by newly developed or updated applications, referred to as "zero-day" applications, leaving networks vulnerable to potential security risks. Furthermore, conventional classification systems that may run on edge devices may include only a small subset of a fully known application set and may therefore not be scalable due to constraints of local compute and memory platforms.

SUMMARY OF THE DISCLOSURE

Devices and methods for adaptively classifying network traffic associated with a new application in accordance with embodiments of the disclosure are described herein. In many embodiments, a network device comprises a memory, a processor communicatively coupled to the memory, and a network traffic classification logic for adaptively classifying network traffic associated with a new application. The memory is configured to store a machine learning model pre-trained based on historical network traffic associated with a set of applications. The network traffic classification logic is configured to receive network traffic associated with a new application that is different from the set of applications; and classify the received network traffic as one of legitimate traffic or anomalous traffic based on the machine learning model. The machine learning model is configured to learn one or more patterns associated with the received network traffic; and detect whether the learned one or more patterns have a similarity greater than a threshold value with respect to a set of previously learned patterns of at least one application in the set of applications, wherein the received network traffic is classified as one of the legitimate traffic or the anomalous traffic based on the detection.

In a number of embodiments, the machine learning model is pre-trained with contrastive learning to distinguish between a plurality of traffic types in the historical network traffic.

In a variety of embodiments, the machine learning model learns the one or more patterns associated with the received network traffic based on the contrastive learning.

In various embodiments, the network traffic classification logic is further configured to re-train the machine learning model based on one or more confirmed instances of the classification.

In more embodiments, the network traffic classification logic is further configured to re-train the machine learning model based on reinforcement learning.

In additional embodiments, the network traffic classification logic is further configured to: extract at least one packet from the received network traffic; convert the at least one packet into a sequence of tokens representing a plurality of features of the at least one packet; and generate, for the at least one packet, a sequence of embeddings associated with the sequence of tokens.

In further embodiments, the plurality of features comprises a source address, a destination address, one or more port numbers, a packet size, one or more protocol types, one or more timestamps, and one or more bytes of a payload.

In still more embodiments, the machine learning model comprises an encoder and a decoder.

In still further embodiments, the encoder is configured to add a positional encoding, which identifies a position of each token in the sequence of tokens, to the sequence of embeddings.

In still additional embodiments, the encoder comprises a multi-head attention layer configured to: receive the sequence of embeddings; and generate, for the at least one packet, a high-dimensional representation based on the sequence of embeddings.

In some more embodiments, the multi-head attention layer comprises a plurality of attention heads.

In yet various embodiments, each attention head of the plurality of attention heads is configured to generate one or more attention weights, indicating a relevance each embedding in the sequence of embeddings has with respect to each other embedding in the sequence of embeddings, wherein the high-dimensional representation is generated based on the one or more attention weights generated by the each attention head of the plurality of attention heads.

In yet more embodiments, the encoder further comprises a feed-forward neural network layer configured to: receive the high-dimensional representation of the at least one packet; and apply one or more transformations to the high-dimensional representation to learn the one or more patterns of the received network traffic.

In still yet more embodiments, the decoder is configured to: receive the learned one or more patterns from the feed-forward neural network layer; and detect whether the received one or more patterns have the similarity greater than the threshold value with respect to the set of previously learned patterns of the at least one application.

In many further embodiments, the decoder is further configured to classify the received network traffic as the legitimate traffic based on the detection that the received one or more patterns have the similarity greater than the threshold value.

In many additional embodiments, the decoder is further configured to classify the received network traffic as the anomalous traffic based on the detection that the received one or more patterns have the similarity less than the threshold value.

In still yet further embodiments, the new application corresponds to a zero-day application that is unknown to the machine learning model.

In still yet additional embodiments, the network device is an edge device.

In several embodiments, the edge device is an access point.

In several more embodiments, a method comprises receiving a training dataset comprising historical network traffic associated with a set of applications; training a machine learning model based on the training dataset, wherein, based on the training, the machine learning model learns a plurality of patterns associated with the historical network traffic and attains a capability to classify network traffic associated with a new application that is different from the set of applications as one of legitimate traffic or anomalous traffic; and deploying the machine learning model for network traffic classification on an edge device.

In numerous embodiments, training the machine learning model comprises utilizing contrastive learning on the machine learning model, wherein based on the contrastive learning, the machine learning model learns to distinguish between a plurality of traffic types in the historical network traffic and learns the plurality of patterns associated with the historical network traffic.

In numerous additional embodiments, a method for adaptively classifying network traffic associated with a new application comprises running a machine learning model that is pre-trained based on historical network traffic associated with a set of applications, on an edge device; receiving network traffic associated with a new application that is different from the set of applications; and classifying the received network traffic as one of legitimate traffic or anomalous traffic utilizing the machine learning model, wherein classifying the received network traffic comprises: learning, by the machine learning model, one or more patterns associated with the received network traffic; and detecting, by the machine learning model, whether the learned one or more patterns have a similarity greater than a threshold value with respect to a set of previously learned patterns of at least one application in the set of applications, wherein the received network traffic is classified as one of the legitimate traffic or the anomalous traffic based on the detection.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently disclosed embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
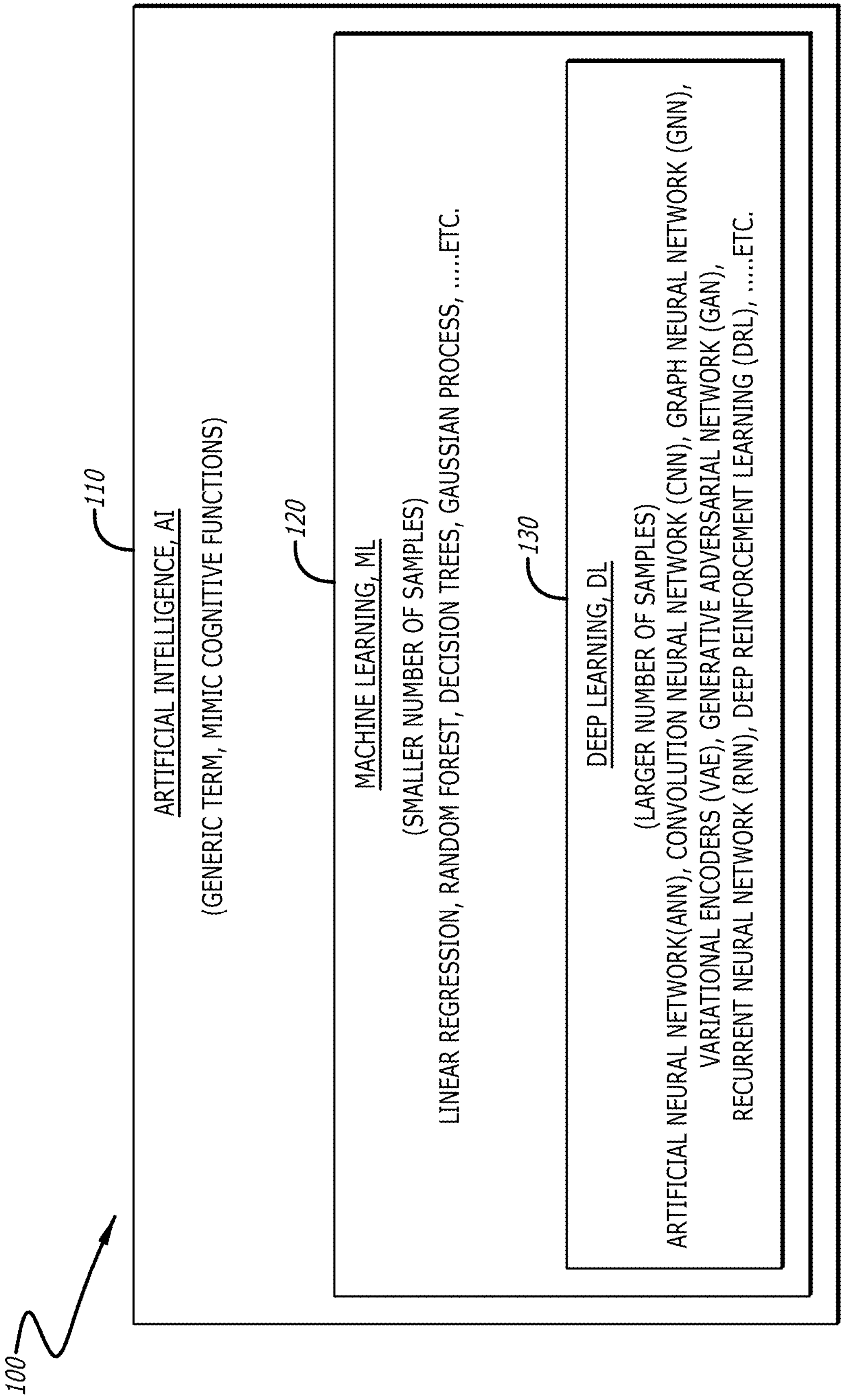
FIG. 1 is a schematic diagram illustrating various subsets of artificial intelligence in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in a commercially feasible embodiment are often not depicted to facilitate a less obstructed view of these various embodiments of the present disclosure.

DETAILED DESCRIPTION

In response to the issues described above, devices and methods are discussed herein for adaptively classifying network traffic associated with a new application. Network traffic may refer to data that is transmitted over a network. Network traffic may stem from numerous different types of communication, for example, requests, responses, and data transmitted between devices on the network. The data associated with the network traffic may include, for example, files, messages, queries, and system updates. Network traffic may be encapsulated in packets, which are units of data that provide a load in the network. Network traffic may be measured, for example, in terms of bandwidth usage, latency, and packet count. Network traffic may be classified, for example, as legitimate traffic or anomalous traffic, depending on its source and intent. Legitimate traffic may refer to network traffic that may be authorized, expected, and typical for normal operations within the network. Legitimate traffic may include, for example, packets of data from standard user activities, routine system processes, and communications that align with an intended use of the network. These packets may initiate from and/or may be destined for an authorized or uncompromised node of the network. Legitimate traffic may be non-malicious and may comply with established network policies. Anomalous traffic may refer to network traffic that may deviate from normal patterns, often indicating unusual or suspicious behavior. Anomalous traffic may include, for example, data associated with unexpected spikes in traffic, unusual data sources or destinations, or activities that may not align with typical user behavior. Anomalous traffic may indicate security threats such as cyberattacks, malware, or other forms of malicious activity. As used herein, "new application" may refer to a newly developed or updated application or software having vulnerabilities or security flaws that may be unknown to a vendor or a developer at the time they are discovered or exploited by attackers. The new application may, for example, be a zero-day application. The term "zero-day" may indicate that the vendor has had zero days to address the vulnerabilities in the new application before the vulnerabilities are exploited. The vulnerabilities in zero-day applications may be utilized by attackers to gain unauthorized access or cause damage before the vulnerabilities are publicly known or resolved.

There is a need for classifying between legitimate traffic and anomalous traffic for several reasons. For example, detecting anomalous traffic may facilitate early identification of potential security breaches or cyberattacks, allowing organizations to mitigate risks before significant damage occurs. Moreover, accurately distinguishing between legitimate traffic and anomalous traffic may help reduce the occurrence of false positives, which can overwhelm security systems and lead to unnecessary resource allocation. Without proper detection and classification mechanisms, network administrators may be unable to efficiently monitor, analyze, and respond to threats in real time. However, the classification process may be complicated by several challenges that evolve with the changing landscape of Internet usage and the continuous development of new applications. For example, the variety of protocols and applications that generate network traffic, coupled with frequent updates and the emergence of new software, may contribute to creating a substantially diverse and constantly changing network traffic profile. This diversity may require a classification system that is scalable, flexible, adaptive, and capable of distinguishing between several different types of network traffic with high precision. Moreover, network traffic patterns (herein referred to as "patterns") can vary rapidly due to various factors such as new user behavior, network policies, software updates, or the like, which may affect the accuracy of conventional classification systems due to the inherent variability in network traffic data. Furthermore, since zero-day applications may generate new or unseen patterns, conventional classification systems that typically rely on previously observed network data, predefined signatures, or behavioral models, cannot recognize these new or previously unseen patterns. Consequently, these conventional classification systems may lack prior knowledge of these new patterns, hindering their ability to accurately identify them and leaving network management systems vulnerable to potential security risks. Further, signature-based models encounter difficulties when faced with minor variations in data patterns, and therefore may flag safe network traffic as malicious due to pattern changes.

Some classification systems may include machine learning models such as Deep Neural Network (DNN) models that may classify network traffic. However, these DNN models are large models and thus may not run on an edge device at the edge of the network, which may be required for improving response times and enabling real-time decision making for execution of immediate actions. Running DNN models on a local Central Processing Unit (CPU), Neural Processing Unit (NPU), or Tensor Processing Unit (TPU) on an edge device may not be feasible due to various system constraints and compute capability constraints based on the number of parameters that may be computed and the rate at which they may be computed, thereby affecting their ability to recognize variations to known applications. Moreover, while the DNN models can be made adaptable, for example, by tuning sparsity of the structure of the DNN models, by pruning the DNN models, by changing their quantization, by distillation, or the like, these approaches may create a set of new models, each with a smaller footprint but lower accuracy, which may consequently defeat a goal of high accuracy. Scalable, high accuracy, and adaptable models can be realized, but typically in an "or" fashion, where multiple models may be stored in a repository, and an algorithm may fetch or query a model of choice based on criteria such as real-time inference, or high accuracy, or the like. Therefore, while some conventional classification systems may be limited in realizing only one of the goals that is, for example, scalability, high accuracy, or adaptability, when running at the edge of the network, others may realize all the goals without being run at the edge of the network.

Further, the goals including scalability, high accuracy, and adaptability may not be achievable on a static system (where each application may be a configured static set of patterns) because such a static system may be unable to recognize new applications of the same type as other known applications (for example, recognizing a new voice application, because the model has learned the general idea on "how a voice application flow would look like"). Such dynamic learning may be possible with various structures, for example, with forward deep learning. However, such a structure is heavy, with an outcome that the implementation must be a tradeoff between recognition speed and ability to learn (that is, a system that recognizes known applications fast is also slow to learn new applications, and vice versa). This is because the number of parameters used to perform the inference and the learning is a direct predictor of the recognition speed and the learning capabilities (larger parameter set→slower inference, but better learning capability, that is, a better ability to recognize that a data flow is a new application).

The present disclosure addresses the above-mentioned challenges by providing devices and methods with integrated advanced machine learning techniques capable of adaptively and accurately classifying network traffic, ensuring that organizations can better defend against cyber threats while maintaining the efficiency and performance of their networks. The present disclosure may provide a machine learning model that is both flexible and adaptive, capable of distinguishing between numerous different types of traffic with high precision. In many embodiments, the machine learning model may operate on the edge device, while being scalable, highly accurate, and adaptable. A success rate of the machine learning model disclosed herein may be measurably high and may stay high as pattern variations for known applications are introduced and can, in near real time, learn new applications. In a number of embodiments, the machine learning model may be configured as a neural network-based model that can recognize relationships between new and previous patterns associated with the network traffic and robustly classify the network traffic, while overcoming the specific challenges of protocol and application diversity, variability in patterns, and the emergence of zero-day application traffic. In a variety of embodiments, the machine learning model may be scalable and capable of handling the large-scale nature of network data, providing timely classifications suitable for real-time analysis. In various embodiments, the machine learning model may be resilient to rapid changes in patterns associated with various factors, for example, new user behavior, network policies, software updates, or the like. In more embodiments, the machine learning model may maintain high accuracy levels in classification tasks, despite the diversity of applications and the variability in the patterns. In additional embodiments, the machine learning model may generalize from known applications to accurately identify new or unseen patterns generated by zero-day applications and accurately classify the network traffic therefrom.

In further embodiments, the machine learning model disclosed herein may be implemented with a dedicated architecture including a specific structure, for example, a neural processing unit/tensor structure, for running on the edge device at the edge of the network. An edge device may refer to a physical or virtual device located at the edge of the network, near a source of data generation or consumption. In still more embodiments, the edge device may be an access point. The edge device may be responsible for processing, analyzing, or storing data locally, often without needing to transmit all the data to a central server or a cloud. The edge device may be configured to perform computations or data processing locally or closer to where the data originates, reducing latency, conserving bandwidth, improving security, and enabling real-time decision-making. In still further embodiments, running the machine learning model on the edge device may facilitate the processing of data locally on the edge device, which may reduce the time for transmitting the data to the central server or the cloud, thereby substantially improving response times and enabling real-time decision-making. Moreover, running the machine learning model on the edge device may reduce the need for expensive cloud infrastructure and reduce the strain on central servers, allowing for better scalability in large-scale deployments. Further, by performing computations on the edge device, only relevant or summarized data may need to be transmitted to the central server or the cloud, thereby minimizing bandwidth usage and reducing network congestion. In still additional embodiments, the edge device may be optimized for low power consumption, allowing them to run the machine model with lower energy usage compared to cloud-based processing. Furthermore, local processing may allow sensitive data to remain on the edge device rather than being transmitted over the network, which enhances privacy and security by reducing exposure to potential breaches during transmission.

Aspects of the present disclosure may be embodied as an apparatus, a system, a method, or a computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," a "module," an "apparatus," or a "system." Furthermore, aspects of the present disclosure may take the form of a computer program product embodied in one or more non-transitory computer-readable storage media storing computer-readable and/or executable program code. Many of the functional units described in this specification have been labeled as functions, to emphasize their implementation independence more particularly. For example, a function may be implemented as a hardware circuit comprising custom Very Large Scale Integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, a procedure, or a function. The executables of an identified function need not be physically located together but may comprise disparate instructions stored in different locations which, when joined logically together, comprise the function and achieve the stated purpose for the function.

A function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media.

Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, an apparatus, a processor, or a device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages, or the like) or other discrete electrical devices, in electrical communication with one or more other components through electrical lines of a Printed Circuit Board (PCB) or the like. Each of the functions and/or modules described herein, in some more embodiments, may alternatively be embodied by or implemented as a component.

A circuit, as used herein, comprises a set of one or more electrical and/or electronic components providing one or more pathways for electric current. In additional embodiments, a circuit may include a return pathway for electric current, so that the circuit is a closed loop. In further embodiments, however, a set of components that does not include a return pathway for electric current may be referred to as a circuit (e.g., an open loop). For example, an integrated circuit may be referred to as a circuit regardless of whether the integrated circuit is coupled to ground (as a return pathway for electric current) or not. In still more embodiments, a circuit may include a portion of an integrated circuit, an integrated circuit, a set of integrated circuits, a set of non-integrated electrical and/or electrical components with or without integrated circuit devices, or the like. In still further embodiments, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, a programmable array logic, a programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a PCB or the like. Each of the functions and/or modules described herein, in still additional embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B, or C" or "A, B, and/or C" mean "any of the following: A; B; C; A and B; A and C; B and C; A, B, and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram 100 illustrating various subsets of artificial intelligence in accordance with various embodiments of the disclosure is shown. Artificial intelligence (AI) 110 is typically understood in the art to be the development of machines and algorithms that mimic human intelligence, for example, by optimizing actions to achieve certain goals. At its core, AI 110 often involves designing algorithms and models that mimic cognitive functions, such as learning, reasoning, problem-solving, perception, and even language understanding. Unlike conventional computer programs that follow a fixed set of instructions, AI systems can adapt, improve, and make decisions based on input data and environmental interactions.

AI 110 can be considered a generic term because AI 110 encompasses a wide range of subfields and techniques, from simple rule-based systems to advanced machine learning and deep learning models. These AI techniques are utilized for simulating various aspects of human cognition. For example, Machine Learning (ML) 120 allows computers to learn from data patterns without explicit programming for each task, while Natural Language Processing (NLP) enables machines to understand and generate human language. Deep learning (DL) 130, a more advanced branch of AI 110, utilizes neural networks to automatically learn complex patterns from large datasets, akin to information processing by the human brain. This versatility makes AI 110 a powerful tool across diverse applications, including adaptive network traffic classification, image recognition, autonomous driving, voice assistants, healthcare diagnostics, and materials discovery.

A goal of AI 110 is often to create systems that can function autonomously and intelligently in real-world scenarios. As AI 110 continues to evolve, AI 110 can increasingly mirror human-like cognition, enabling machines to not just process data but to "think" in a way that can handle uncertainty, make predictions, and even interact with their surroundings in a meaningful manner. While AI systems are far from achieving the full breadth of human intelligence, their ability to replicate specific cognitive functions makes them invaluable in tackling complex, data-driven challenges.

ML 120 is a subset of AI 110 that focuses on the development of algorithms and statistical models that enable computers to learn and make decisions from data without explicit programming. In conventional programming, a computer is given a fixed set of rules to follow, but ML 120 can shift this paradigm by allowing systems to identify patterns, adapt, and improve their performance based on the data they encounter. This data-driven approach makes ML 120 particularly valuable for tasks that are too complex or dynamic to define using straightforward rules, such as determining patterns associated with network traffic, recognizing images, predicting consumer behavior, or diagnosing diseases. In various embodiments described herein, machine-learning methods may be utilized to classify the network traffic as legitimate traffic or anomalous traffic.

ML models can be configured to analyze large amounts of data to identify trends and relationships that inform their predictions or classifications. The process typically involves three stages: training, validation, and testing. During training, the ML model learns from a dataset by adjusting its internal parameters to minimize errors between its predictions and the actual results. Techniques such as linear regression, decision trees, random forests, and Gaussian processes are commonly utilized in ML 120. These algorithms can handle various data types, including numerical, categorical, and structured datasets such as spreadsheets or grids. One of the strengths of ML 120 is its ability to generalize from training data to make accurate predictions on new, unseen data. In a number of embodiments described herein, training data may be generated from historical network traffic including, for example, requests, responses, other communications, or the like, associated with a set of applications, among other sources.

However, conventional ML methods may rely heavily on feature engineering, wherein human experts manually identify the most relevant features or patterns within the data. For example, when using ML 120 for adaptively classifying network traffic, an expert may need to extract features such as source addresses, destination addresses, port numbers, packet sizes, one or more protocol types, or the like, before feeding them into the ML model. This requirement can limit the scalability of conventional ML approaches, especially when dealing with large, unstructured datasets such as images, text, or graphs. Additionally, ML algorithms may often work best when provided with relatively structured data, and they often need a reasonable number of samples (typically more than 100) to learn effectively.

DL 130 is a specialized subset of ML 120 that employs multi-layered artificial neural networks to automatically learn complex patterns and representations from large, often unstructured datasets. Inspired by the way the human brain processes information, DL 130 includes interconnected layers of "neurons" that can adaptively change as they are exposed to more data. Unlike conventional ML methods, which require manual feature engineering to identify data characteristics, DL models can automatically extract features directly from raw data, such as images, text, or molecular structures. This automated feature extraction allows DL 130 to handle data types and tasks that were previously difficult or impossible for ML models to tackle effectively.

DL models, including Convolutional Neural Networks (CNNs), Graph Neural Networks (GNNs), and Recurrent Neural Networks (RNNs), excel at processing various forms of data. CNNs are particularly effective for image analysis, recognizing intricate patterns in visual inputs, making them indispensable in areas like materials science for analyzing microscopic images or detecting defects in materials. GNNs, on the other hand, are designed to work with graph-based data, such as network traffic, molecular structures, atomic interactions, loads, or the like. GNNs can learn the dependencies and relationships within graph-like structures, which is crucial for predicting properties of complex patterns, molecules, and materials. For example, the features of packets constituting the network traffic are modeled as a graph, which may be input into a GNN for classifying the network traffic as legitimate traffic or anomalous traffic. By organizing the features of the packets into a graph structure, situations where new or unseen patterns generated by newly developed or updated applications, referred to as "zero-day" applications, are unknown, may be handled optimally. RNNs and their variants, such as Long Short-Term Memory (LSTM) networks, are suited for sequential data such as time series or NLP, allowing for the analysis and generation of textual information or the prediction of temporal patterns in scientific research.

One of the defining characteristics of deep learning is its requirement for large datasets (typically over 500 samples for example) to effectively train neural networks. While the deep, multi-layered structure of these networks enables them to capture highly complex and abstract representations of the data, they also demand significant computational power. Techniques such as Variational Autoencoders (VAEs) and Generative Adversarial Networks (GANs) add to the versatility of DL 130 by enabling the generation of new data samples that resemble a training dataset, aiding in areas such as materials discovery and synthetic data creation. Deep Reinforcement Learning (DRL) combines neural networks with decision-making processes to solve problems that involve optimization and control, further expanding the application potential of DL 130. In summary, the ability of DL 130 to automatically learn from raw, unstructured data and model intricate patterns makes DL 130 a powerful tool in AI 110, particularly for complex domains such as image recognition, NLP, and materials science.

Artificial Neural networks (ANNs or sometimes merely NNs) are often a foundation of a DL system. The basic unit of a neural network is typically the perceptron, which can take inputs, assigns weights to these inputs, and combines them to produce an output. The final output is then passed through an activation function, for example, Rectified Linear Unit (ReLU), sigmoid, or hyperbolic tangent, to introduce non-linearity, which enables the network to model complex patterns.

Neural networks are typically trained through a process of backpropagation, where an AI system's predictions are compared against the known output, and a loss function is utilized to measure the difference between the prediction and the actual result. The network's weights can be adjusted through a process called gradient descent, which can be configured to minimize the loss function over time. However, the training process can be prone to problems such as overfitting (where the ML model performs well on the training data but poorly on new data). To counter this, techniques such as regularization (e.g., dropout), early stopping, and mini-batches can be utilized to prevent the network from becoming overly specialized to the training dataset.

CNNs are a specific type of ML neural network designed to work particularly well with network data, making them highly relevant for adaptively classifying network traffic, which may be subject to processing. As those skilled in the art will recognize, CNNs typically utilize specialized layers known as convolutional layers, which apply filters (also known as kernels) to the input data. These filters slide over the input (e.g., an input power value), detecting patterns such as edges or textures, which are then passed to the next layer for further processing. The advantage of CNNs is their ability to automatically learn and extract relevant features from raw data without the need for manual feature engineering. Furthermore, pooling layers (e.g., max-pooling or average pooling) are often added after convolutional layers to reduce the dimensionality of the data, helping to make the system more efficient while retaining the most important information. After several layers of convolutions and pooling, the CNN can output a prediction, such as whether the network traffic is legitimate traffic or anomalous traffic.

While CNNs are well-suited for grid-based data like images, many real-world problems can involve non-grid data, such as packet data or the like. This type of data may better be represented as a graph, where nodes represent entities (e.g., network devices, Internet Protocol "IP" addresses, applications, or the like) and edges represent relationships between them (e.g., communication patterns or data flows between the network devices and the applications). Thus, Graph Neural Networks (GNNs) can be utilized to operate on such graph-based data.

In GNNs, information is passed between nodes through edges in a process called message passing. This allows the network to capture dependencies and relationships within the graph structure. The key feature of GNNs is their ability to aggregate information from neighboring nodes, which is crucial in predicting properties that depend on the current/local structure, such as the behavior of the applications or the properties of the devices.

Generative models aim to learn the underlying distribution of a dataset and generate new samples that resemble the original data. Two common types of generative models are Variational Autoencoders (VAEs) and Generative Adversarial Networks (GANs). VAEs are often configured to work by encoding data into a lower-dimensional latent space and then decoding the data back into its original form. This allows for the generation of new data by sampling points from the latent space. This can be utilized when attempting to construct a graph based on features of the packets and the network devices or applications.

Similarly, GANs include two components: a generator that creates fake/generated data and a discriminator that tries to distinguish between real and fake data. The two components are trained in a competitive process where the generator tries to "fool" the discriminator, leading to increasingly realistic generated data. This type of process may be utilized to produce synthetic samples that resemble the training data, which can help augment the training dataset.

Reinforcement Learning (RL) involves an agent learning to make decisions by interacting with an environment and receiving feedback (rewards or penalties) based on its actions. Deep Reinforcement Learning (DRL) combines RL with DL techniques, allowing agents to learn from high-dimensional inputs, such as images or complex network traffic simulations.

In adaptive network traffic classification, DRL can be utilized in scenarios where an optimal decision needs to be made, such as adaptively classifying network traffic as legitimate traffic and anomalous traffic based on various features such as packet headers, data flow characteristics, etc. The combination of RL and DL 130 can allow for learning from raw data, making it a powerful tool for dynamic and real-time decision-making for adaptive network traffic classification.

Although a specific embodiment for various subsets of artificial intelligence suitable for carrying out the various steps, processes, methods, and operations described herein is discussed with respect to FIG. 1, any of a variety of systems and/or processes may be utilized in accordance with embodiments of the disclosure. For example, another subset may be present and available for use within AI 110. Those skilled in the art will recognize that the diagram 100 presented in FIG. 1 is simplified for illustration purposes and various methods and techniques may interact with other areas (ML 120 with DL 130, etc.). The elements depicted in FIG. 1 may also be interchangeable with other elements of FIGS. 2-10 as required to realize a particularly desired embodiment.

Figure 2:
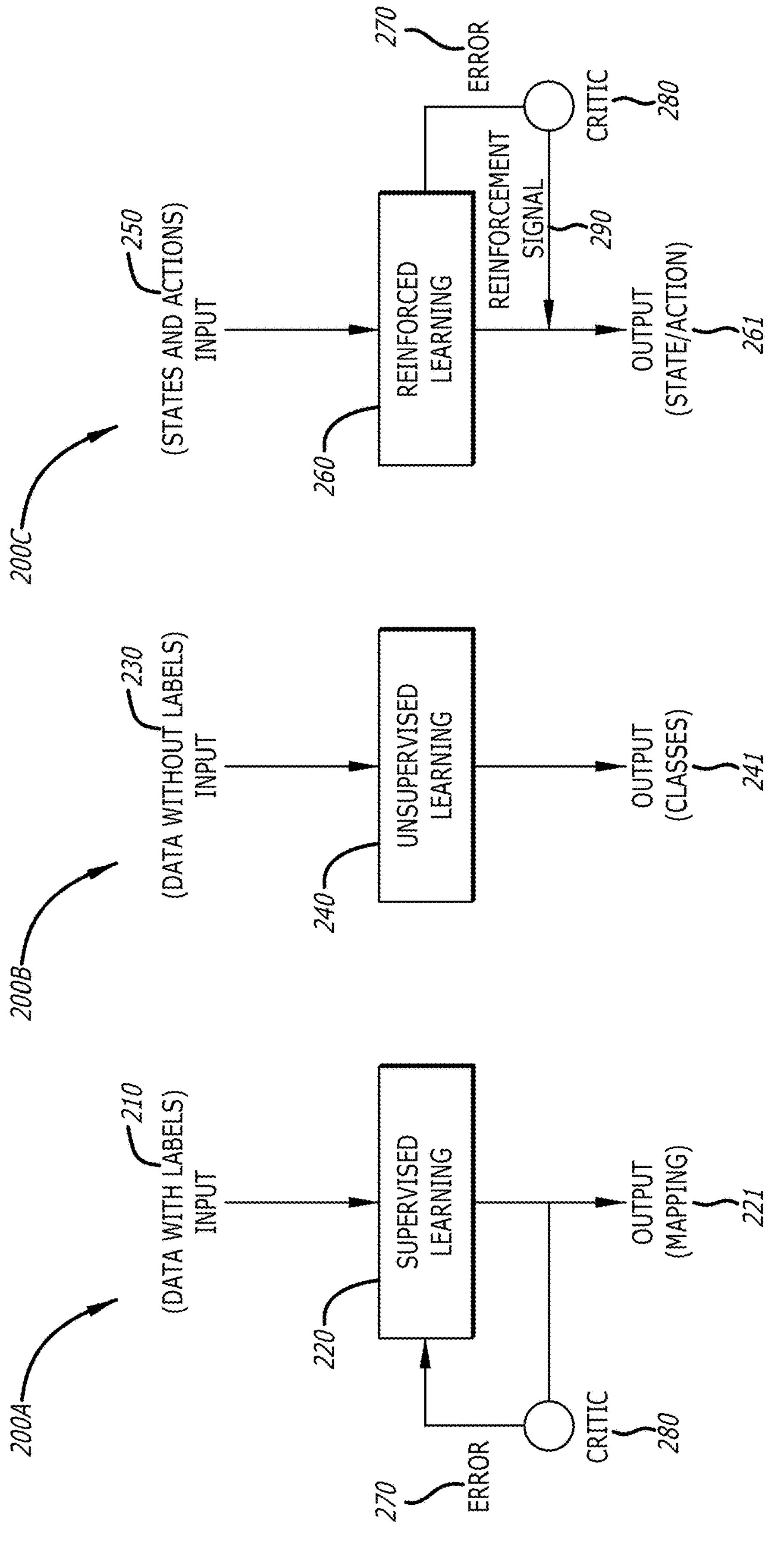
FIG. 2 is a block diagram illustrating different methods of machine-based learning in accordance with various embodiments of the disclosure.

Referring to FIG. 2, a block diagram illustrating different methods of machine-based learning in accordance with various embodiments of the disclosure is shown. In many embodiments, a machine learning model is defined as a mathematical representation of an output of a training process. An ML model is often considered similar to computer software designed to recognize patterns or behaviors based on previous experience or data. An ML algorithm can discover patterns within training data, and output an ML model which can capture these patterns and make predictions on new data.

ML models may be interpreted as devices that have been trained to find patterns within new data and make predictions. These ML models can be represented as complex mathematical functions that would be impractical for a human to calculate, that takes requests in the form of input data, makes predictions on input data, and then provides an output in response. These ML models can be trained over a set of data, and then they may be provided an algorithm or other task to reason over the data, extract patterns from feed data, and learn from that data. Once the ML models are trained, they can be utilized to predict a new and previously unseen dataset.

There are various types of ML models available based on different business goals and datasets available. Often, based on the desired application, ML models can be configured as or settled into one of three different model types: supervised learning, unsupervised learning, and/or reinforcement learning. Supervised learning can further be broken down into two categories of classification and regression. Likewise, unsupervised learning can be divided into three categories: clustering, association rule, and/or dimensionality reduction.

In the embodiment depicted in FIG. 2, a supervised learning system 200A is shown. The supervised learning system 200A can be configured with a supervised learning model 220 that accepts input data 210 and generates output data 221. The output data 221 is often reviewed by a critic 280 that can determine one or more errors 270 that are fed back into the supervised learning model 220 for use in updating.

Supervised learning systems 200A are often considered the simplest ML model to understand which input data (such as training data) has a known label or result as an output. The supervised learning model 220 can, therefore, be understood to work on the principle of input-output pairs. As such, a function can be trained using a training dataset, which is then applied to unknown data to make some predictions. Supervised learning is task-based and mostly tested on labeled datasets.

Supervised learning systems 200A may often involve one or more regression problems. In regression problems, the output is a continuous variable. Examples of commonly utilized regression models include linear regression, decision trees, and random forests. Linear regression is typically the most straightforward ML model in which a prediction of one output variable is made using one or more input variables. The representation of linear regression can be processed as a linear equation, which combines a set of input values (denoted as x) and a predicted output (denoted as y) for the set of those input values. As those skilled in the art will recognize, this linear equation may be represented in the form of a line: y=bx+c. A typical aim of a linear regression-based model can be to find an optimal fit line that best fits available data points. Linear regression can be extended to multiple linear regressions (finding a plane of best fit in a higher dimensional space) and polynomial regressions (finding the best fit curve).

Decision trees are also popular ML models that can be utilized for both regression and classification problems. A decision tree utilizes a tree-like structure of decisions along with their possible consequences and outcomes. In a decision tree, each internal node is utilized to represent a test on an attribute while each branch is utilized to represent the outcome of the test. The more nodes a decision tree has, the more accurate the result will be. This may be utilized when making decisions related to network traffic and their separation. Decision trees are intuitive and easy to implement, but may lack accuracy depending on computational or time resources available.

Random forests are an ensemble learning method, which may include a large number of decision trees. For example, each decision tree in a random forest predicts an outcome, and the prediction with a majority of votes is considered as the outcome. A random forest model can be utilized for both regression and classification problems. For a classification task, the outcome of the random forest may be taken from the majority of votes. Whereas in a regression task, the outcome can be taken from a mean or an average of the predictions generated by each tree.

Classification models are the other type of supervised learning, which can be utilized for generating conclusions from observed values in one or more categorical forms. For example, a classification model can identify if an email is spam or not; whether network traffic is legitimate or anomalous, etc. Classification algorithms can also be utilized for predicting between two or more classes and/or categorize an output into different groups. For these classification systems, a classification model can be designed that classifies a dataset into different categories, and each category can subsequently be assigned a label. As those skilled in the art will recognize, there are currently two main types of classifications in machine learning: binary and multi-class. Binary classification can be utilized when there are only two possible classes (i.e., yes/no, dog/cat, etc.). Multi-class classification can be utilized when there are more than two possible classes, thus requiring a multi-class classifier.

One of the potential classification processes is logistic regression. Logistic regression can be utilized for solving various classification problems in machine learning systems. These processes are similar to linear regression but are often utilized for predicting categorical variables. While some variations can be configured to generate a prediction as an output in either "yes" or "no," 0 or 1, "true" or "false," etc., in a number of embodiments, the system can instead be configured to not give exact values, but instead provide probabilistic values between zero and one.

Another classification process that can be utilized is a Support Vector Machine (SVM) which is widely utilized for classification and regression tasks. However, the main aim of the SVM is to find the best decision boundaries in an N-dimensional space, which can be utilized for segregating data points into classes, and generate a best decision boundary often known as a hyperplane. SVM processes can select an extreme vector to find a hyperplane, wherein this vector is known as a support vector.

Naïve Bayes is another popular classification algorithm utilized in machine learning. This classification process is based on Bayes' theorem and follows a naïve (independent) assumption between features which is often based on the following formula:

$$P(y|X) = \frac{P(X|y) * P(y)}{P(X)}$$

This formula takes a class or target y and a predictor attribute (X) and calculates a posterior probability P(y|X) of that class given a particular predictor. P(y) is the prior probability of that class, P(X) is the prior probability of the predictor, and P(X|y) is the likelihood or probability of the predictor given the class. As those skilled in the art will recognize, this may be more succinctly understood as a posterior chance being a result of prior results times the likelihood divided by evidence available. Each naïve Bayes classifier assumes that the value of a specific variable is independent of any other variable/feature. For example, if a fruit needs to be classified based on color, shape, and taste, yellow, oval, and sweet will be recognized as mango. In this example, each feature is independent of other features. Likewise, various embodiments herein can classify the network traffic into categories such as web traffic, File Transfer Protocol (FTP) traffic, streaming traffic, social media traffic, gaming traffic, or the like, which may constitute legitimate traffic or anomalous traffic.

Further, in the embodiment depicted in FIG. 2, an unsupervised learning system 200B is shown. The unsupervised learning system 200B can be configured with an unsupervised learning model 240 that accepts input data 230 and generates an output 241. Unlike other model types, there are no critics or error signals to process. Unsupervised learning models 240 can implement a learning process opposite to supervised learning, which means the learning process enables a model to learn from an unlabeled training dataset. Based on the unlabeled training dataset, the unsupervised learning model 240 can predict the output 241. Using the unsupervised learning system 200B, the unsupervised learning model 240 can learn hidden patterns from the unlabeled training dataset by itself without any supervision. In a variety of embodiments, unsupervised learning models 240 are often utilized for performing tasks involving clustering, association rule learning, and/or dimensional reduction.

Clustering is an unsupervised learning technique that involves clustering or grouping the available data points into different clusters based on similarities and/or differences. The data points or objects with the most similarities remain in the same group, and they have no or very few similarities from other groups. Clustering algorithms can be utilized in various tasks such as, but not limited to image segmentation, statistical data analysis, market segmentation, or the like. Some commonly utilized clustering algorithms that can be selected include, for example, K-means clustering, hierarchal clustering, Density-based Spatial Clustering of Applications with Noise (DBSCAN), etc.

Association rule learning is an unsupervised learning technique which finds unique relations among variables within a large dataset. In various embodiments, a primary aim of this type of learning algorithm is to find a dependency of one data item on another data item and map those variables accordingly to satisfy a desired outcome. For example, in more embodiments, an association rule system may be utilized for grouping packets extracted from the network traffic into clusters and categorizing them. This learning algorithm can be applied in market basket analysis, web usage mining, continuous production, etc. However, those skilled in the art will recognize that other scenarios may be available based on the desired application. Some popular algorithms of association rule learning are Apriori Algorithm, Eclat, and Frequent Pattern (FP)-growth algorithm.

In additional embodiments, the number of features/variables present in a dataset can be understood as the dimensionality of the dataset, and the technique utilized to reduce the dimensionality is known as a dimensionality reduction technique. Although more data provides more accurate results, more data can also affect the performance of the model/algorithm, for example, by yielding overfitting outcomes. In such cases, dimensionality reduction techniques can be utilized. Dimensionality reduction techniques involve converting a higher-dimensional dataset into a lower-dimensional dataset while also ensuring that the ensuing results provide similar information. Different dimensionality reduction methods can be utilized, such as, but not limited to, Principal Component Analysis (PCA), Singular Value Decomposition (SVD), etc.

Further, in the embodiment depicted in FIG. 2, a reinforcement learning system 200C is shown. The reinforcement learning system 200C can be configured with a reinforcement learning model 260 that accepts input data 250 and generates an output 261. In reinforcement learning, the reinforcement learning model 260 learns actions for a given set of states that lead to a goal state. In the embodiment depicted in FIG. 2, a critic 280 can receive or otherwise notice an error 270 within the reinforcement learning model 260 actions, and transmit a reinforcement signal 290 to adjust the outcome/output such that the "reward" or "punishment" is adjusted to better model the future behaviors or processing of the reinforcement learning model 260.

The reinforcement learning model 260 is a feedback-based learning model that can take feedback signals after each state or action by interacting with the environment. This feedback works as a reward (positive for each good action and negative for each bad action), and an AI agent's goal is to maximize the positive rewards to improve their performance. The behavior of the reinforcement learning model 260 in reinforcement learning is similar to that of human learning, as humans learn things by experiences as feedback and interact with an environment. Popular methods of reinforcement learning including Q-learning, State-Action-Reward-State-Action (SARSA), and deep Q network.

Q-learning is one of the popular model-free algorithms of reinforcement learning, which is based on the Bellman equation. Q-learning often aims to learn a policy that can help an AI agent to take the best action for maximizing a reward under a specific circumstance. Q-learning can incorporate a Q-value for each state-action pair that indicates the reward to following a given state path, and tries to maximize that Q-value.

SARSA is an on-policy algorithm based on the Markov decision process. In further embodiments, SARSA can use the action performed by the current policy to learn the Q-value. The SARSA algorithm stands for State Action Reward State Action, which symbolizes the tuple (s, a, r, s', a'). A Deep Q-Network (or DQN) implements Q-learning within a neural network. The DQN can be deployed within a big state space environment where defining a Q-table would be a complex task. In these embodiments, rather than using a Q-table, the DQN utilizes Q-values for each action based on the state.

Although a specific embodiment for different methods of machine-based learning suitable for carrying out the various steps, processes, methods, and operations described herein is discussed with respect to FIG. 2, any of a variety of systems and/or processes may be utilized in accordance with various embodiments of the disclosure. For example, those skilled in the art will recognize that methods of learning described herein are generalized and may incorporate other types developed as well as a combination of one or more methods based on the goals of the desired application. The elements depicted in FIG. 2 may also be interchangeable with other elements of FIG. 1 and FIGS. 3-10 as required to realize a particularly desired embodiment.

Figure 3:
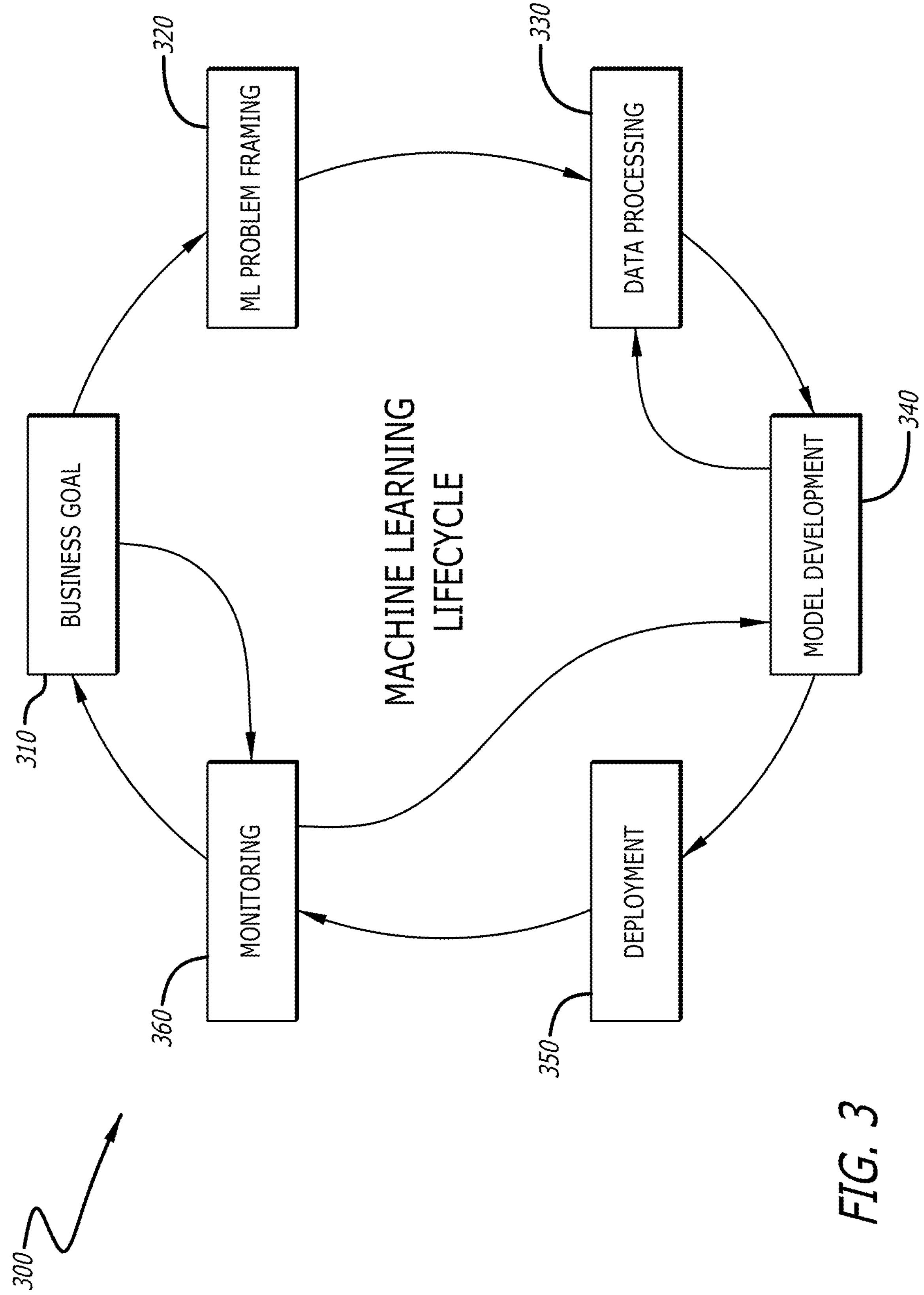
FIG. 3 is a block diagram illustrating a machine learning lifecycle in accordance with various embodiments of the disclosure.

Referring to FIG. 3, a block diagram illustrating a machine learning lifecycle 300 in accordance with various embodiments of the disclosure is shown. While developing machine learning systems, the embodiment depicted in FIG. 3 can provide a framework for structuring the design and maintenance of these machine learning systems. The machine learning lifecycle 300 outlines various stages involved in building, deploying, and improving ML models to solve real-world problems. By following this structured process, businesses and organizations can ensure that their ML projects align with strategic goals, utilize data effectively, and adapt to changing conditions over time. This machine learning lifecycle 300 emphasizes that developing an ML model is not a one-time effort but an iterative process requiring ongoing monitoring and adjustment. A feedback loop inherent in the machine learning lifecycle 300 allows for continual refinement and optimization of the ML models to maintain their accuracy and relevance.

In many embodiments, a first stage of the machine learning lifecycle 300 includes identifying a business goal 310, which sets an overall direction and purpose for an ML project. Identifying the business goal 310 can involve understanding specific problems or opportunities within a business or a project that machine learning can address. A clear business goal 310 ensures that the project remains focused on delivering tangible value, whether it is classifying different types of network traffic or distinguishing between legitimate traffic and anomalous traffic. Without a well-defined business goal 310, it can be challenging to align subsequent stages of the ML lifecycle 300, as the choice of model, data processing methods, and performance metrics can all depend on what the business aims to achieve.

Establishing a proper business goal 310 can also involve engaging with key stakeholders and developers to gather requirements and set success criteria, which can provide a roadmap that outlines what success looks like and helps in framing an ML problem. For example, if the goal is to adaptively classify network traffic associated with a new application such as a zero-day application, as legitimate traffic or anomalous traffic, the project may focus on developing an ML model that utilizes known patterns generated by known applications as input for accurately identifying new or unseen patterns generated by the new application. Clearly defined business goals not only help guide the project but also provide benchmarks for evaluating the effectiveness of the deployed ML model once the deployed ML model enters production.

Once the business goal 310 is established, various embodiments take a next step involving ML problem framing 320, wherein the business goal 310 is translated into a specific machine learning task. This can involve selecting the appropriate type of ML problem, such as classification, regression, clustering, or recommendation, and defining target variables or outputs. For example, if the business goal 310 is to adaptively classify network traffic associated with a new application, as legitimate traffic or anomalous traffic, the problem can be framed as a regression task where the ML model treats features of at least one packet in the network traffic such as source address, destination address, port numbers, packet size, protocol types, or the like as variables and a similarity threshold value as a metric for detecting whether patterns learned by the ML model are similar to a set of previously learned patterns of at least one known application. Proper ML problem framing 320 determines particular data requirements, choice of model, and evaluation metrics.

During the stage of ML problem framing 320, it is also prudent to consider constraints and assumptions that may affect the development of the ML model. The constraints and assumptions may include, for example, data availability, computational resources, ethical considerations, or regulatory compliance. Properly framing the ML problem ensures that the development of the ML model aligns with the needs of the business and that the ML problem is broken down into manageable steps, ultimately increasing the project's chances of success.

Data processing 330 is a stage in many embodiments where raw data is collected, cleaned, and transformed into a format suitable for machine learning. This stage of the machine learning lifecycle 300 can involve gathering data from various sources, removing errors or inconsistencies, handling missing values, and normalizing or scaling features to ensure that the ML model can learn effectively. Feature engineering is often a part of this stage, where new features are derived from the raw data to capture more relevant information and improve model performance.

The quality and preparation of the utilized data can significantly impact the accuracy and reliability of the ML model. Inadequate or poorly processed data can lead to biased or inaccurate predictions, no matter how advanced the ML model is. Hence, data processing 330 can require or at least benefit from careful planning and iterative refinement. Once the data is processed, the data is typically split into training, validation, and test datasets to develop and evaluate the ML model, ensuring that the ML model generalizes well to new, unseen data.

Model development 340 is a stage, in a number of embodiments, where machine learning algorithms are selected, trained, and refined to create an ML model that addresses the framed problem. This stage can involve choosing an appropriate algorithm (e.g., decision trees, neural networks, support vector machines, or the like), setting up the architecture of the ML model, and defining hyperparameters that will guide the training process. The ML model is trained on the processed data to identify patterns and relationships that allow the ML model to make predictions or decisions.

During model development 340, the ML model can be evaluated using the validation dataset to finetune its parameters and improve performance. Techniques such as cross-validation, regularization, and hyperparameter tuning can be utilized to prevent overfitting and ensure the ML model generalizes well. If proper steps are taken, the result is an ML model that, once the ML model meets predefined performance metrics, is ready for deployment in a real-world environment. However, model development 340 often involves several iterations to optimize the ML model for the specific business goal, indicated by an arrow directed back to data processing 330.

In further embodiments, deployment 350 is the stage of the machine learning lifecycle 300 where the developed ML model is integrated into a production environment to perform its intended tasks. This stage may involve setting up necessary infrastructure, such as Application Programming Interfaces (APIs) or cloud-based services, to allow the ML model(s) to process live data and generate predictions. Deployment 350 can transform the ML model from a research tool into a functional component of a business process or product, providing real-time insights, automations, or decisions.

Proper deployment 350 can also include setting up mechanisms for logging, error handling, and user access. Since real-world environments are often dynamic and differ from training conditions, deployment 350 may require continuous adaptation and updates to ensure the ML model(s) operates efficiently. This stage may define the success of the ML model because the ML model's success is not only determined by its performance metrics but also by its ability to provide actionable results that align with the business goal 310.

In more embodiments, monitoring 360 is an ongoing process of tracking the performance and behavior of the ML model after deployment 350. Monitoring 360 involves collecting data on the ML model's predictions, accuracy, latency, and error rates to detect issues such as concept drift, where changes in the underlying data patterns can degrade the accuracy of the ML model. By continuously monitoring 360, teams can identify when the performance of the ML model drops and requires retraining or adjustments to align with evolving data.

Monitoring 360 can also encompass aspects such as user feedback, security, and compliance, ensuring that the ML model remains effective, reliable, and ethical in its application. Monitoring 360 may serve as a feedback loop in the machine learning lifecycle 300, where insights gained from monitoring feedback into the earlier stages of the machine learning lifecycle 300, particularly data processing 330 and model development 340, to refine the ML model(s) as needed. This iterative process allows a machine learning system to adapt and maintain its alignment with the original business goal 310 over time.

Although a specific embodiment for a machine learning lifecycle 300 suitable for carrying out the various steps, processes, methods, and operations described herein is discussed with respect to FIG. 3, any of a variety of systems and/or processes may be utilized in accordance with embodiments of the disclosure. For example, the particular route of development of the ML model(s) may not follow this machine learning cycle 300 completely. As those skilled in the art will recognize, there are a variety of ways to develop AI products that include various iterative steps that aid in development and refinement of different ML models. The elements depicted in FIG. 3 may also be interchangeable with other elements of FIGS. 1-2 and FIGS. 4-10 as required to realize a particularly desired embodiment.

Figure 4:
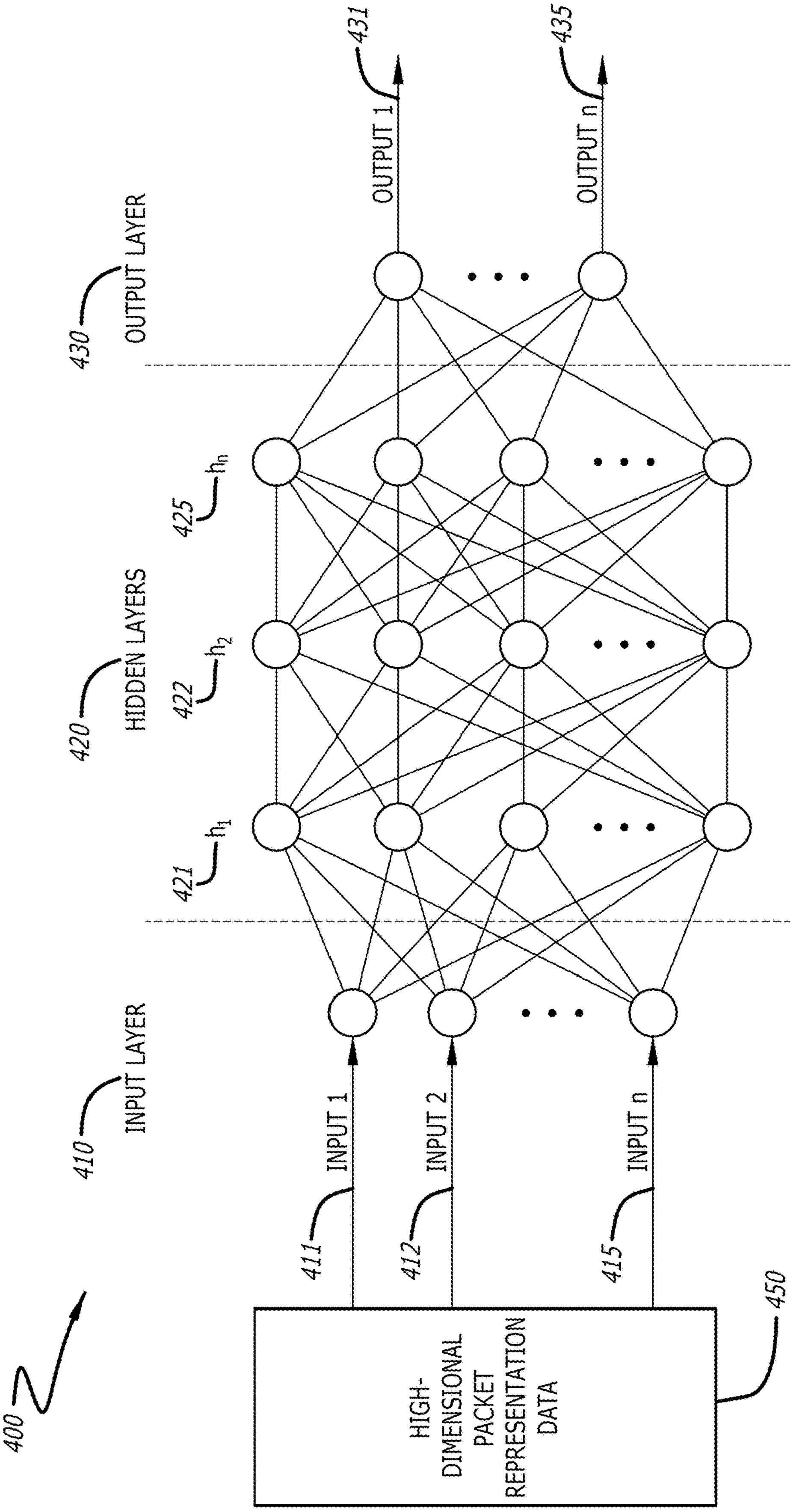
FIG. 4 is a schematic diagram illustrating an exemplary neural network in accordance with various embodiments of the disclosure.

Referring to FIG. 4, a schematic diagram illustrating an exemplary neural network 400 in accordance with various embodiments of the disclosure is shown. The embodiment illustrated in FIG. 4 specifically depicts a feed-forward neural network with multiple layers. This type of network includes an input layer 410, one or more hidden layers 420, and an output layer 430. Each layer contains nodes (or neurons) that are interconnected, representing how data flows through the feed-forward neural network. The input layer 410 can receive raw data, which is then processed by the hidden layers 420 through weighted connections and activation functions. These hidden layers 420 can enable the feed-forward neural network to learn complex patterns and relationships within the data.

The final output layer 430 produces predictions or classifications of the feed-forward neural network based on the processed data. The interconnected nature of the nodes allows the neural network 400 to learn from data during training by adjusting weights of connections to minimize prediction errors. This structure is the foundation of deep learning models, as adding more hidden layers 420 can create a deep neural network, capable of tackling highly complex tasks such as image recognition, NLP, and pattern detection in large datasets.

A perceptron or a single artificial neuron is the building block of artificial neural networks (ANNs) and can perform forward propagation of information. For a set of inputs to the perceptron, weights (and biases to shift wights) can be assigned. These inputs and weights can be multiplied out correspondingly together to get a sum output. Those skilled in the art will recognize tools such as, but not limited to, PyTorch, Tensorflow, and MXNet as training packages for common neural network tasks. However, it is contemplated that other tools may be developed specifically for the neural network tasks related to the embodiments described herein.

In many embodiments, weight matrices of the neural network 400 can be initialized randomly or obtained from a pre-trained model. These weight matrices can be multiplied with the input matrix (or output from a previous layer) and subjected to a nonlinear activation function to yield updated representations, which are often referred to as activations or feature maps. A loss function (also known as an objective function or empirical risk) can often be calculated by comparing the output of the neural network 400 and known target value data.

Feed-forward networks, such as the neural network 400 depicted in the embodiment of FIG. 4, are often configured as neural networks where information moves in one direction, from the input layer 410 through the hidden layers 420 to the output layer 430, without any cycles or loops. The feed-forward networks are primarily utilized for tasks such as classification, regression, and simple pattern recognition, where each input is processed independently of others. In contrast, backpropagation is not a separate type of network but rather a training algorithm commonly utilized in both feed-forward and other types of networks such as Recurrent Neural Networks (RNNs).

Backpropagation involves adjusting the weights of the neural network in a reverse direction (from output to input) based on an error between a predicted output and an actual target during training. While feed-forward describes the structure and data flow within the neural network, backpropagation is a technique utilized to optimize the model. Feed-forward networks are utilized for straightforward tasks where input-output relationships are not sequential or time-dependent. However, for problems involving learning complex patterns over time, such as speech recognition or time-series analysis, neural networks that leverage backpropagation for training such as RNNs or deep feed-forward networks with many hidden layers, become necessary to capture these intricate dependencies.

Typically, in these network arrangements, the weights are iteratively updated via various methods including, but not limited to, stochastic gradient descent algorithms to help minimize the loss function until a desired accuracy is achieved. Most modern deep learning frameworks can facilitate this iterative update by using reverse-mode automatic differentiation to obtain partial derivatives of the loss function with respect to each network parameter through recursive application of a chain rule. Colloquially, this is also known as backpropagation. Common gradient descent algorithms can include, but are not limited to, Stochastic Gradient Descent (SGD), Adam, Adagrad, etc. Learning rate is an important parameter in gradient descent. Except for SGD, all other methods use adaptive learning parameter tuning. Depending on the objective such as classification or regression, different loss functions such as Binary Cross Entropy (BCE), Negative Log Likelihood Loss (NLLL), or Mean Squared Error (MSE) can be utilized.

Neural network architecture is commonly utilized for a wide range of tasks in fields such as computer vision, NLP, financial forecasting, and materials science. For instance, the neural network architecture can be employed to recognize patterns in images such as identifying objects or faces, or to classify text into categories such as spam detection in emails or network traffic classification. The neural network architecture is also useful in regression problems, such as predicting stock prices or energy consumption, where input features can be processed to output continuous values. However, this is a general example of an AI model, illustrating how a feed-forward neural network works. Depending on the problem, other methods and models may be more appropriate. For example, CNNs are often utilized for image processing tasks, while RNNs are suitable for sequential data like time series data or text. Additionally, simpler models such as linear regression, decision trees, or SVMs may be sufficient if the problem is less complex, or a dataset is relatively small. The embodiment depicted in FIG. 4 is presented as an exemplary ML solution that may be deployed within one or more methods or systems described herein.

In a number of embodiments, the input layer 410 is the first layer in the neural network 400 and serves as the initial point where raw data is introduced into the model. Each node (or neuron) in this input layer 410 represents an individual feature or variable from the dataset, allowing the neural network 400 to receive and process various types of data, such as pixel values in an image, numerical features in a spreadsheet, or words in a text document. For instance, in image recognition tasks, the input layer 410 can include nodes that correspond to pixel values of the image, providing the neural network 400 with visual information needed to identify objects or patterns. The number of nodes in the input layer 410 directly depends on the number of features present in the dataset. If there are one-hundred features in the data, the input layer 410 will typically have one-hundred nodes, each conveying one piece of the information to the subsequent layers. In a variety of embodiments, the inputs of the neural network 400 are generally scaled, that is, normalized to have a zero mean and/or unit standard deviation. Scaling can also be applied to the input of the hidden layers 420 (using batch or layer normalization) to improve the stability of neural network 400.

Unlike the hidden layers 420 and the output layer 430, the input layer 410 typically does not perform any computations or transformations on the data. The primary function of the input layer 410 is often to pass the input data to the next layer in the neural network 400, that is, the first hidden layer 421. However, it is often desired that the data fed into this hidden layer 421 is preprocessed appropriately, such as being normalized or standardized, to ensure that the neural network 400 can learn efficiently. Proper preprocessing, like scaling numerical values or encoding categorical variables, can help the neural network 400 process data uniformly, facilitating more stable and faster convergence during training.

The design of the input layer 410 depends on the nature of the problem. For example, in NLP, the input layer 410 may represent words encoded as numerical vectors, while in time-series analysis, each node may represent a data point in a sequence. While the input layer 410 itself does not modify the data, the input layer 410 sets the stage for the neural network 400 to extract complex patterns and relationships through the deeper layers. This flexibility in handling various types of input make the neural network 400 a powerful tool for a diverse set of applications.

With respect to the embodiments described herein, the input layer 410 may be configured with a plurality of inputs providing high-dimensional packet representation data 450 generated by a multi-head attention layer of an ML model. In various embodiments, the ML model may be pre-trained based on historical network traffic associated with a set of applications. For at least one packet extracted from the input network traffic, the multi-head attention layer may generate a high-dimensional packet representation based on a sequence of embeddings. The sequence of embeddings may be associated with a sequence of tokens representing multiple features of the packet(s). The features of the packet(s) may include, for example, a source address, a destination address, one or more port numbers, a packet size, one or more protocol types, one or more timestamps, and one or more bytes of a payload. The high-dimensional packet representation may be generated based on one or more attention weights generated by each attention head of the multi-head attention layer.

In an example, the ML model can be configured with a first input 411 configured as an input high-dimensional packet representation associated with one packet of the input network traffic, a second input 412 is configured with an input high-dimensional packet representation associated with another packet of the input network traffic, while additional inputs can be added related to the number of packets in the input network traffic. The nth input 415 can be configured in various embodiments to include an nth high-dimensional packet representation associated with an nth packet of the input network traffic. However, as those skilled in the art will recognize, additional setups can be configured such that the inputs 411, 412, and 415 can be configured to also include different parameters such as IP addresses, one or more port numbers, packet sizes, one or more protocol types, one or more timestamps, one or more bytes of a payload, weights, etc.

In more embodiments, the neural network 400 comprises a plurality of hidden layers 420. The embodiment depicted in FIG. 4 comprises a first hidden layer 421, a second hidden layer 422, and an nth hidden layer 425, which are denoted as $h_1$, $h_2$, and $h_n$, respectively. In additional embodiments, the hidden layers 420 are disposed where the core of the ML model's learning and pattern recognition occurs. In each of the hidden layers 420, individual neurons receive inputs from the previous layer, apply a set of weights, add a bias, and pass the result through an activation function (e.g., ReLU, leaky ReLU, sigmoid, hyperbolic tangent (tanh), Swish, etc.). This process can introduce non-linearity, allowing the neural network 400 to capture complex patterns in the data that simple linear models cannot. The intricate web of connections among neurons across layers helps the neural network 400 transform and process input features into representations that become progressively more abstract and useful for making predictions.

The first hidden layer 421, $h_1$, receives direct input from the input layer 410, transforming the raw data into an initial set of features. For example, in an image recognition task, this layer may begin identifying basic patterns, such as edges or simple textures. The output of the first hidden layer 421 is then passed to the second hidden layer 422, $h_2$, which builds upon the features identified by the first hidden layer 421. This deeper hidden layer 422 may start recognizing more complex patterns, such as shapes or specific object components, by combining the lower-level features identified earlier. This can continue until a last, nth hidden layer 425, $h_n$, continues this abstraction process, allowing the neural network 400 to recognize even higher-level, more detailed features, such as identifying an entire object within an image or understanding intricate relationships in the input data. With respect to the embodiments described herein, the hidden layers 420 may apply one or more transformations to the high-dimensional packet representation data 450 to learn one or more patterns of the input network traffic, thereby refining the high-dimensional packet representation data 450 to extract higher-level features from the raw attention output of the multi-head attention layer. These transformations may improve the ability of the ML model to distinguish between legitimate traffic and anomalous traffic.

Each of the hidden layers 420 adds a level of complexity and abstraction to the learning capabilities of the neural network 400. The multi-layer structure can enable the neural network 400 to move from recognizing simple patterns in the first hidden layer 421 to highly complex, abstract concepts in the deeper layers. The number of hidden layers 420 and neurons within them can vary depending on the complexity of the problem. More hidden layers 420 generally allow the neural network 400 to model more intricate functions, making deep neural networks especially effective for tasks such as image recognition, NLP, and complex predictive modeling. However, adding more layers also increases the computational demand and the risk of overfitting, highlighting the need to carefully design and tune these hidden layers 420 for optimal performance.

In further embodiments, the output layer 430 is often the final layer in the neural network 400 and is responsible for producing predictions or classifications of the neural network 400 based on the information processed through the previous hidden layers 420. Each neuron in the output layer 430 can represent a specific outcome or category that the ML model can predict. In the embodiment depicted in FIG. 4, the outputs are labeled as "output 1" 431 to "output n" 435, indicating that the neural network 400 can be designed to have a varying number of outputs depending on the nature of the problem being solved. For example, in a binary classification (e.g., legitimate traffic versus anomalous traffic), there would typically be a single output neuron that provides a probability score for one of the two classes/outcomes. In contrast, for multi-class classification (e.g., categorizing network traffic into different types based on protocols utilized in communications), the output layer 430 would contain multiple neurons, each corresponding to a different class.

The number of neurons in the output layer 430 can also be designed specifically for other types of tasks, such as regression, where the ML model can predict continuous values. In such cases, the output layer 430 may contain a single neuron representing a numerical prediction, such as a price of a house or a temperature forecast, etc. Alternatively, in complex applications such as multi-label classification (where each input can belong to multiple classes simultaneously), the output layer 430 could have multiple neurons, each representing a different class, with each neuron outputting a probability of the input belonging to that specific class.

The activation function utilized in the output layer 430 can vary based on the desired output. For binary classification, a sigmoid function is commonly utilized to produce a probability between 0 and 1. For multi-class classifications, a softmax function can be applied to output a set of probabilities that sum to 1, indicating the most likely class. For regression problems, a linear activation function is often utilized to output a continuous range of values. The flexibility in designing the output layer 430 allows the neural network 400 to be applied to a wide variety of tasks, from simple binary decisions to complex multi-output predictions, making them a versatile tool in artificial intelligence and machine learning.

Although a specific embodiment for an exemplary neural network 400 suitable for carrying out the various steps, processes, methods, and operations described herein is discussed with respect to FIG. 4, any of a variety of systems and/or processes may be utilized in accordance with embodiments of the disclosure. For example, real-world neural networks are often far more complex, featuring many more layers, nodes, and connections than the simplified structure shown in the embodiment depicted in FIG. 4, which is an illustrative example meant to make it easier to explain the basic concepts of neural networks and how they process information. The specific features and functions described herein are not intended to be limiting to this specific embodiment. The elements depicted in FIG. 4 may also be interchangeable with other elements of FIGS. 1-3 and FIGS. 5-10 as required to realize a particularly desired embodiment.

Figure 5:
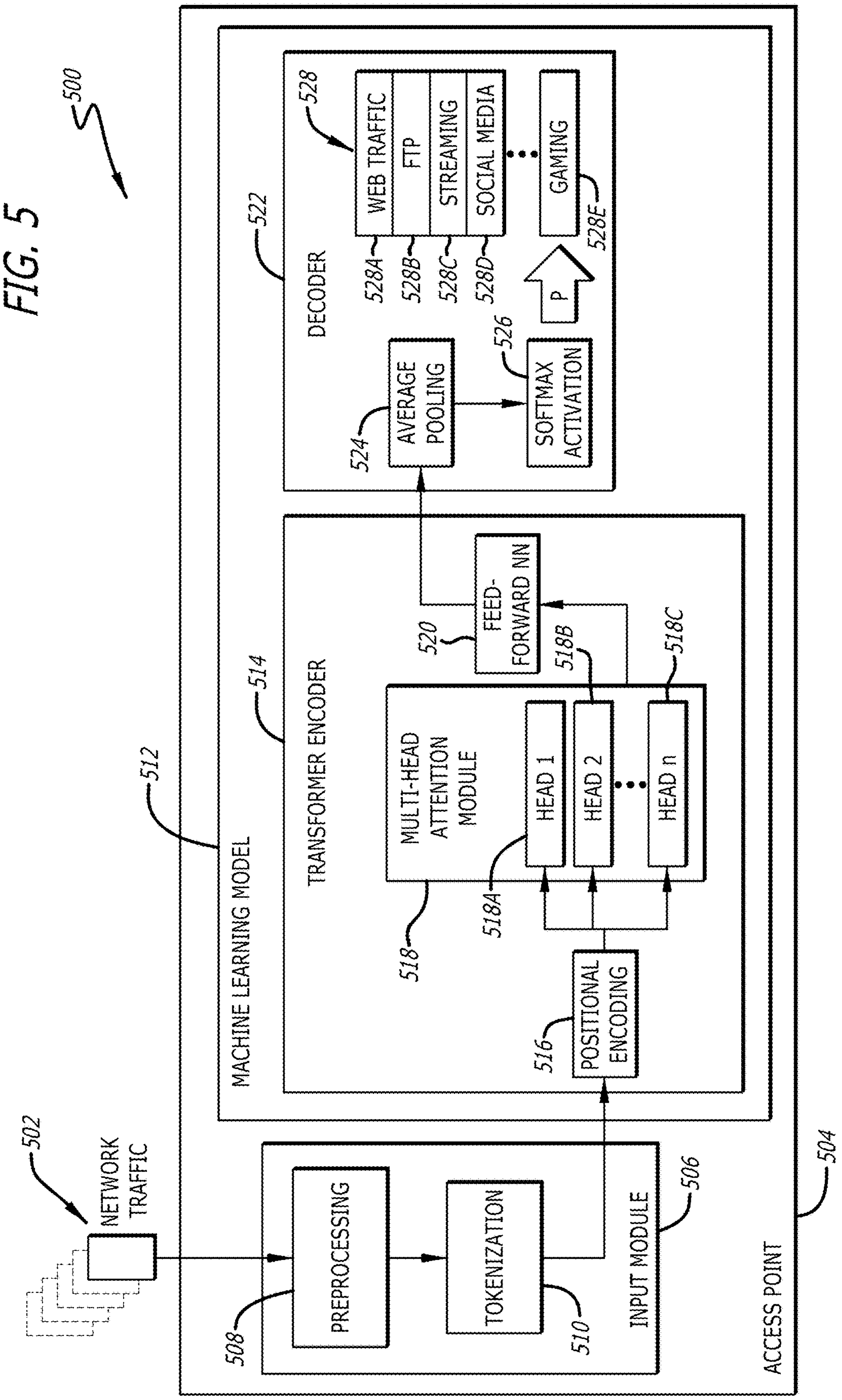
FIG. 5 is a block diagram illustrating a system for adaptively classifying network traffic associated with a new application in accordance with various embodiments of the disclosure.

Referring to FIG. 5, a block diagram illustrating a system 500 for adaptively classifying network traffic associated with a new application in accordance with various embodiments of the disclosure is shown. The new application may refer to a newly developed or updated application or software, for example, a zero-day application, having vulnerabilities or security flaws that may be unknown to a vendor or a developer at the time they are discovered or exploited by attackers. The new application may, for example, be a web application, a streaming application, a social media application, Moving Pictures Expert Group (MPEG) audio layer 3 (MP3) file sharing applications, a gaming application, or the like. The system 500 may include a machine learning model 512 deployed on an edge device, for example, an access point 504. The access point 504 may refer to a network device that allows wireless devices to connect to a wired network, for example, a Local Area Network (LAN). The access point 504 may allow the wireless devices to connect to the wired network by utilizing, for example, Wi-Fi® or other wireless technologies. The access point 504 may act as a bridge between the wireless devices and the wired network, enabling the wireless devices to access the wired network, share resources, and communicate with other devices. In many embodiments, as an edge device, the access point 504 may be located at the edge of a network, near a source of data generation or consumption. In a number of embodiments, the access point 504 may be responsible for processing, analyzing, or storing data locally, often without needing to transmit all the data to a central server or a cloud. The access point 504 may be configured to perform computations or data processing locally or closer to where the data originates, reducing latency, conserving bandwidth, improving security, and enabling real-time decision-making. In a variety of embodiments, the access point 504 may include specialized hardware or software architecture that is configured to run the machine learning model 512 and handle specific tasks, workloads, or processing requirements efficiently, with real-time constraints, and without relying on cloud or central servers for processing. In various embodiments, the access point 504 may be configured for machine learning-driven zero-day network traffic classification. Zero-day network traffic may refer to network traffic generated by zero-day applications.

The machine learning model 512 may be implemented on a specific, dedicated architecture, for example, a Neural Processing Unit (NPU)/tensor structure, in the access point 504, which makes the implementation of the machine learning model 512 easily detectable. In more embodiments, the machine learning model 512 may be stored in a memory of the access point 504. In additional embodiments, the machine learning model 512 may be configured as a Deep Neural Network (DNN) model that can run at the edge on the access point 504, where resources of the NPU are limited, while still achieving goals of being scalable, highly accurate, and able to detect zero-day threats, thereby being able to flag anomalous traffic. Being scalable, the machine learning model 512 may run at the rate of network traffic flow through the access point 504. In further embodiments, the machine learning model 512 may be configured to be flexible, adaptive, and capable of distinguishing between numerous different types of network traffic 502 with high precision. In still more embodiments, the machine learning model 512 may be configured to be resilient to rapid changes in patterns associated with the network traffic 502 due to various factors such as new user behavior, network policies, software updates, or the like, and to maintain high accuracy despite the inherent variability in the network traffic 502. In still further embodiments, the machine learning model 512 may be configured to generalize from known applications to accurately identify new patterns associated with the network traffic 502. These new patterns may be generated by zero-day applications that have not been seen during training of the machine learning model 512 and hence the machine learning model 512 has no prior knowledge thereof.

In still additional embodiments, the machine learning model 512 may be configured as a neural network-based model that can robustly classify the network traffic 502, while overcoming specific challenges of protocol and application diversity, variability in the patterns associated with the network traffic 502, and an emergence of network traffic 502 generated by zero-day applications. To achieve this, in some more embodiments, the machine learning model 512 may be integrated with advanced machine learning techniques such as attention layers and transformer models for pattern learning from known patterns and handling the above-mentioned challenges. In yet various embodiments, the layers in the machine learning model 512 may be tailored for zero-day application traffic classification. The machine learning model 512 disclosed herein may be scalable and can handle the large-scale nature of the network traffic 502, providing classifications in a timely manner that are suitable for real-time analysis. The machine learning model 512 may also maintain high accuracy levels in classification tasks, despite the diversity of applications and the variability in the patterns associated with the network traffic 502. Further, the machine learning model 512 may exhibit an ability to generalize from known data to accurately classify the network traffic 502 from new, unseen applications.

In yet more embodiments, the machine learning model 512 may be pre-trained based on historical network traffic associated with a set of applications. The set of applications may include, for example, web applications, web services, voice applications, conversational video applications, interactive video applications, streaming applications, social media applications, online and cloud-rendered gaming applications, interactive remote presence applications, instant messaging applications, remote desktop applications, cloud-based applications, cloud-rendered virtual reality or augmented reality applications, or the like. In still yet more embodiments, the machine learning model 512 may be pre-trained with contrastive learning to distinguish between multiple traffic types in the historical network traffic. By training on a diverse set of known traffic types, the machine learning model 512 may learn to recognize underlying patterns and features that are indicative of particular types of network behavior or application usage. Contrastive learning may refer to a type of unsupervised learning technique that focuses on extracting meaningful representations by contrasting positive and negative pairs of instances or data points including, for example, features extracted from the network traffic. Contrastive learning may tend to minimize the distance between positive pairs and maximize the distance between negative pairs. The positive and negative pairs of instances may be contrasted by utilizing a similarity metric, for example, a cosine similarity or Euclidean distance. The positive pairs may include pairs of similar instances. The similar instances may include two instances of network traffic that belong to the same class, for example, two packets from the same legitimate application. The negative pairs may include pairs of dissimilar instances. The dissimilar instances may include instances that belong to different classes, for example, one legitimate packet and one anomalous packet. By framing learning as a discrimination task, contrastive learning may allow the machine learning model 512 to capture relevant features and similarities in the network traffic. In many further embodiments, contrastive learning can be utilized to learn feature embeddings that help distinguish between different types of network traffic, for example, legitimate traffic versus anomalous traffic, or classify the network traffic based on application or protocol type.

Contrastive learning may further be utilized to learn representations such that similar instances are closer together in a learned embedding space, while dissimilar instances are farther apart. The embedding space may refer to a continuous, high-dimensional vector space where the instances of network traffic are represented as vectors also referred to as "embeddings." In contrastive learning, the machine learning model 512 may learn to map the instances of the network traffic into the embedding space where similar instances are closer together and dissimilar instances are farther apart. In many additional embodiments, a contrastive loss function, for example, triplet loss or Normalized Temperature-scaled Cross Entropy (NT-Xent) loss, may be utilized to minimize the distance between similar instances and maximize the distance between dissimilar instances. In still yet further embodiments, the machine learning model 512 may be pre-trained to generate embeddings of network traffic that allow the machine learning model 512 to distinguish between different traffic types. During training, the machine learning model 512 may adjust the embeddings so that similar traffic types (e.g., packets from the same application) are grouped together and dissimilar traffic types (e.g., legitimate traffic versus anomalous traffic) are separated. After training, the machine learning model 512 may generate embeddings that can be utilized for various downstream tasks such as adaptive network traffic classification. Incorporating contrastive learning techniques during training improves the ability of the machine learning model 512 to distinguish between different types of network traffic. By learning to identify subtle differences and similarities among the traffic types, the machine learning model 512 may become better at recognizing new patterns that are not covered in its training data. The contrastive learning approach may enhance the capability of the machine learning model 512 to classify zero-day network traffic by relating the zero-day network traffic to the closest known traffic types or by flagging the zero-day network traffic as potentially anomalous if the zero-day traffic significantly deviates from known patterns. Implementing the contrastive learning approach during training may improve the ability of the machine learning model 512 to generalize to unseen traffic types. By learning to differentiate between similar and dissimilar patterns, the machine learning model 512 can better recognize new patterns associated with zero-day applications.

In an exemplary implementation of the system 500 illustrated in FIG. 5, the access point 504 may include an input module 506 and the pre-trained machine learning model 512. The input module 506 may receive network traffic 502 associated with a new application, for example, a zero-day application, that is different from the set of applications. In still yet additional embodiments, the input module 506 may treat the network traffic 502 as statements or sentences in a language that need to be summarized and classified. In several embodiments, instead of utilizing a Large Language Model (LLM) that operates on a substantial number of parameters and therefore is challenging to be run on an edge device, the pre-trained machine learning model 512 may be configured as a low resource-intensive language model including parts of the LLM customized for processing the network traffic 502, for example, zero-day application traffic, on the edge device. The network traffic 502 may include multiple packets associated with the new application. The input module 506 may receive the packets of the network traffic 502 as input data including, for example, sequences of packet features derived from network flows. The sequences of packet features may include, for example, raw byte sequences or higher-level features extracted from the packets. In several more embodiments, the input module 506 executes preprocessing 508 of the input data into a format suitable for the machine learning model 512. In numerous embodiments, preprocessing 508 may include converting each packet into a sequence of tokens representing multiple features of the packet. The features of each packet may include, for example, Internet Protocol (IP) addresses such as a source address and/or a destination address, one or more port numbers, a packet size, one or more protocol types, one or more timestamps, and one or more initial bytes of a payload. In numerous additional embodiments, a fixed-length representation may be utilized for the payload to handle variable packet sizes. In further additional embodiments, the input module 506 further executes tokenization 510 similar to NLP. During tokenization 510, the input module 506 may tokenize the preprocessed data, that is, the sequence of tokens, into a sequence of embeddings. An embedding may refer to a learned representation of data in a continuous, dense vector space, where each instance or data point of the network traffic 502 may be represented as a vector. In many embodiments, for packet-specific features such as IP addresses or port numbers, custom embeddings may be trained as part of the machine learning model 512.

The machine learning model 512 may receive the sequence of embeddings from the input module 506. In a number of embodiments, the machine learning model 512 may integrate advanced machine learning techniques such as transformers and attention layers for network traffic classification. Transformers may capture and generalize from complex patterns in the historical network traffic. The ability to generalize from known data may allow identification of zero-day application traffic, which the machine learning model 512 has not explicitly seen before, by matching patterns generated by the zero-day application traffic with learned patterns that resemble known traffic types. Further, the use of attention layers may allow the machine learning model 512 to dynamically focus on the most relevant parts of the input data when making classification decisions, and improve detection of new or unusual features in zero-day application traffic. For zero-day application traffic, where specific features may not match exactly with those of known applications or threats, the ability of the machine learning model 512 to weigh different aspects of the input data can help identify novel patterns or anomalies that suggest a new, previously unseen type of network traffic.

In the exemplary implementation of the system 500 illustrated in FIG. 5, the machine learning model 512 may include a transformer encoder 514 and a decoder 522. The transformer encoder 514 may be configured to generate high-dimensional representations of the network traffic 502, capturing a wide array of features from the network traffic data. This rich high-dimensional representation space allows the machine learning model 512 to encapsulate complex and nuanced patterns, making it possible to detect and classify zero-day application traffic based on subtle indicators that may be missed by less sophisticated models. The transformer encoder 514 may receive the sequence of embeddings from the input module 506. In a variety of embodiments, since the transformer encoder 514 may not inherently understand the order of the tokens, the transformer encoder 514 may add a positional encoding 516, which identifies a position of each token in the sequence of tokens, to the received sequence of embeddings. Positional encoding 516 may refer to a technique utilized in neural networks, particularly in transformers such as those utilized in NLP, to inject information about a relative or absolute position of tokens in a sequence into the machine learning model 512. As transformers do not have a notion of sequence order in their architecture, the positional encoding 516 may be added to the received sequence of embeddings to convey positional information. The positional encoding 516 may assist the machine learning model 512 to understand which token comes first, second, third, etc., in a sequence. In various embodiments, positional encoding vectors may be added to the received sequence of embeddings before passing them into the transformer layers including, for example, a multi-head attention layer and a feed-forward neural network layer. In more embodiments, the positional encoding vector for each position in the sequence is generated by utilizing sinusoidal functions. Each token may, therefore, include both an embedding representing the token's meaning, and a positional encoding representing its position in the sequence.

In additional embodiments, the transformer encoder 514 may implement an attention layer, for example, a self-attention layer. For each packet associated with the sequence of embeddings, the self-attention layer may compute three vectors, for example, Query (Q), Key (K), and Value (V), where Query may represent a question or a query for a given packet, asking how much attention the given packet should pay to other packets; Key may represent the features or identity of a packet; and Value may contain the content or data of the packet that may be passed forward after attention is applied. These vectors are learned during training and help the machine learning model 512 understand how much attention a particular packet should pay to other packets in the sequence of embeddings. The self-attention layer may compute attention scores by computing a dot product of the Query vector of one packet with the Key vectors of all packets. The self-attention layer may then scale the attention scores and apply a softmax function to convert these attention scores into probabilities. The softmax function may convert the attention scores into probabilities by taking the exponential of each attention score and normalizing these values by dividing by the sum of all the exponentials. This process ensures the output values are in the range (0,1) and sum up to 1, making them interpretable as probabilities. These probabilities, also referred to as "attention weights," may be utilized to weight the Value vectors, which may then be summed up to generate a new high-dimensional representation for each packet.

In further embodiments, the transformer encoder 514 may implement a multi-head attention layer to allow the machine learning model 512 to focus on different parts of the network traffic 502 for different classification tasks, thereby facilitating the identification of the most relevant features for classifying a wide variety of traffic types. The configuration of the multi-head attention layer may allow for application-specific and hardware-specific customization. In still more embodiments, the multi-head attention layer may include multiple attention heads executed in parallel, where each attention head may focus on different aspects of the input, that is, the sequence of embeddings. The multi-head attention layer may allow the machine learning model 512 to capture long-range dependencies between packets in a sequence, even if the packets are far apart, as some behaviors or patterns in the network traffic 502 may span across several packets. For example, the size of a Hypertext Transfer Protocol (HTTP) request and the corresponding response may be relevant to understanding the network traffic behavior, even if they occur several packets apart. In still further embodiments, the machine learning model 512 may learn to focus on time-related patterns, for example, the amount of time that has passed between packets or the rate of the network traffic 502. In still additional embodiments, the machine learning model 512 may learn which packet features, for example, protocol type, source/destination address, or the like, tend to co-occur together, and how certain protocols interact or correlate. By learning relationships between different features of each packet, the machine learning model 512 can identify when some patterns are unusual, helping detect anomalies or attacks such as Distributed Denial-of-Service (DDoS) attacks, port scanning, or the like.

The exemplary implementation of the system 500 illustrated in FIG. 5 shows a multi-head attention module 518 implemented in the transformer encoder 514. The multi-head attention module 518 may receive the sequence of embeddings and generate a high-dimensional representation for each packet based on the sequence of embeddings. The received sequence of embeddings may include continuous vector representations of the tokens, for example, the features of each packet. In some more embodiments, the multi-head attention module 518 may include multiple attention heads, for example, Head 1 518A and Head 2 518B through to Head N 518C, collectively referred to as attention heads 518A-518C. In yet various embodiments, the multi-head attention module 518 executes the attention heads 518A-518C in parallel, where each attention head (e.g., any of the attention heads 518A-518C) may focus on different aspects of the received sequence of embeddings. For example, one attention head may focus on temporal relationships between packets, that is, the time between the packets, while another attention head may focus on protocol relationships such as User Datagram Protocol (UDP) packets versus Transmission Control Protocol (TCP) packets.

Each attention head (e.g., any of the attention heads 518A-518C) may generate one or more attention weights, indicating a relevance each embedding in the sequence of embeddings has with respect to each other embedding in the sequence of embeddings. In yet more embodiments, each attention head (e.g., any of the attention heads 518A-518C) may generate a separate set of attention weights for the Query, Key, and Value vectors, allowing the machine learning model 512 to capture different types of interactions and dependencies in the received sequence of embeddings. The multi-head attention module 518 may generate the high-dimensional representation for each packet based on the attention weight(s) generated by each attention head (e.g., any of the attention heads 518A-518C). In still yet more embodiments, the multi-head attention module 518 may then concatenate outputs of the attention heads 518A-518C and pass the concatenated output through a final linear transformation to generate the high-dimensional representation for each packet. In many further embodiments, the output of the multi-head attention module 518 may be a matrix of the same dimensions as the input, that is, the sequence of embeddings, where each row in the matrix may correspond to an updated high-dimensional representation of the packet. The high-dimensional representations of the packets may capture the interaction between the packets as well as any learned patterns. The multi-head attention module 518 may pass these high-dimensional representations, which encode both local and long-range dependencies in the network traffic 502, to subsequent layers, for example, a neural network, in the transformer encoder 514.

In the exemplary implementation of the system 500 illustrated in FIG. 5, the transformer encoder 514 may include a neural network, for example, a feed-forward Neural Network (NN) 520. In many additional embodiments, the feed-forward neural network 520 may receive the high-dimensional representation of each packet from the multi-head attention module 518 and apply one or more transformations to the high-dimensional representation to learn one or more patterns of the received network traffic. In still yet further embodiments, the transformer encoder 514 may apply the feed-forward neural network 520 independently to the high-dimensional representation of each packet for refining the high-dimensional representations and applying non-linear transformations to extract higher-level features from the output of the multi-head attention module 518. The feed-forward neural network 520 may include one or more fully connected layers, often followed by activation functions such as ReLU or Gaussian Error Linear Unit (GELU). The feed-forward neural network 520 may assist in capturing more complex patterns from the output of the multi-head attention module 518 and enable the machine learning model 512 to learn non-linear decision boundaries. The transformer encoder 514 may apply the feed-forward neural network 520 element-wise to the high-dimensional representation of each packet to transform the high-dimensional representation into a higher-level feature space, further refining the features of each packet that the machine learning model 512 may utilize for downstream tasks such as network traffic classification. This transformation may improve the ability of the machine learning model 512 to differentiate between legitimate traffic and anomalous traffic.

In still yet additional embodiments, the decoder 522 may classify the received network traffic as legitimate traffic or anomalous traffic. The decoder 522 may receive the learned pattern(s) associated with the received network traffic from the feed-forward neural network 520 and detect whether the received pattern(s) has a similarity greater than a threshold value with respect to a set of previously learned patterns of at least one application. If the received pattern(s) has a similarity greater than the threshold value, the decoder 522 may classify the received network traffic as legitimate traffic.

If the received pattern(s) has a similarity less than the threshold value, the decoder 522 may classify the received network traffic as anomalous traffic.

In several embodiments, to handle sequences of variable lengths, the decoder 522 may execute global average pooling 524 for condensing the output of the transformer encoder 514 into a fixed-size vector by averaging across dimensions. That is, global average pooling 524, which is a downsampling operation, may condense the high-dimensional output of the feed-forward neural network 520 into a single vector of a fixed size. If the feed-forward neural network 520 outputs a multi-dimensional array such as a tensor that represents high-level patterns or feature activations over several dimensions, for example, time steps or different packet features, global average pooling 524 computes the average of the activations across all positions in the tensor, thereby generating a single vector of values that summarizes the learned patterns for each class of the network traffic. For example, consider an output tensor of shape (batch_size, feature_dim, sequence_length), where each sequence corresponds to a packet or set of packets. Global average pooling 524 computes the mean of the feature activations over the sequence length or other appropriate dimensions to generate a single vector for each packet or sequence of packets.

In several more embodiments, after global average pooling 524, the decoder 522 may pass the single vector through a softmax activation function 526. The softmax activation function 526 may be utilized to convert the single vector generated by global average pooling 524 into a vector of probabilities across possible classes, for example, legitimate traffic or anomalous traffic. For example, for legitimate traffic, the output of the softmax activation function 526 may be [0.95, 0.05], that is, 95% likelihood of being legitimate, 5% likelihood of being anomalous. Similarly, in another example, for anomalous traffic, the output of the softmax activation function 526 may be [0.10, 0.90], that is, 10% likelihood of being legitimate, 90% likelihood of being anomalous. Once the output of the softmax activation function 526 is generated, the decoder 522 may classify the network traffic as legitimate or anomalous by selecting the class with the highest probability, typically using a thresholding technique. In numerous embodiments, the decoder 522 may output a binary classification for each packet or sequence as "legitimate" or "anomalous". In numerous additional embodiments, the decoder 522 may output a probability distribution over possible traffic types or attack categories. In further additional embodiments, the decoder 522 may add one or more fully connected, dense layers to map the condensed representations to classification targets. These layers may serve as a decision-making component of the machine learning model 512 for determining a class of the network traffic. Various classes 528 of the network traffic may include, for example, web traffic 528A, FTP 528B, streaming 528C, social media traffic 528D, gaming 528E, or the like. The machine learning model 512 may, therefore, output a classification result, for example, "legitimate" or "anomalous" to indicate how likely a given packet or sequence may be part of a particular anomaly or attack. In an example, the classes 528 of the network traffic may correspond to the set of applications.

Although a specific embodiment for a system 500 for adaptively classifying network traffic 502 associated with a new application suitable for carrying out the various steps, processes, methods, and operations described herein is discussed with respect to FIG. 5, any of a variety of systems and/or processes may be utilized in accordance with embodiments of the disclosure. For example, instead of a combination of the multi-head attention layer and the feed-forward neural network layer in the transformer encoder 514, other neural networks and mechanisms such as CNNs, Self-Organizing Maps (SOMs), RNNs including LSTMs or Gated Recurrent Units (GRUs), GNNs, capsule networks, Graph Convolutional Networks (GCNs), or the like can be utilized in the transformer encoder 514 for capturing patterns in the sequences of embeddings. The elements depicted in FIG. 5 may also be interchangeable with other elements of FIGS. 1-4 and FIGS. 6-10 as required to realize a particularly desired embodiment.

Figure 6:
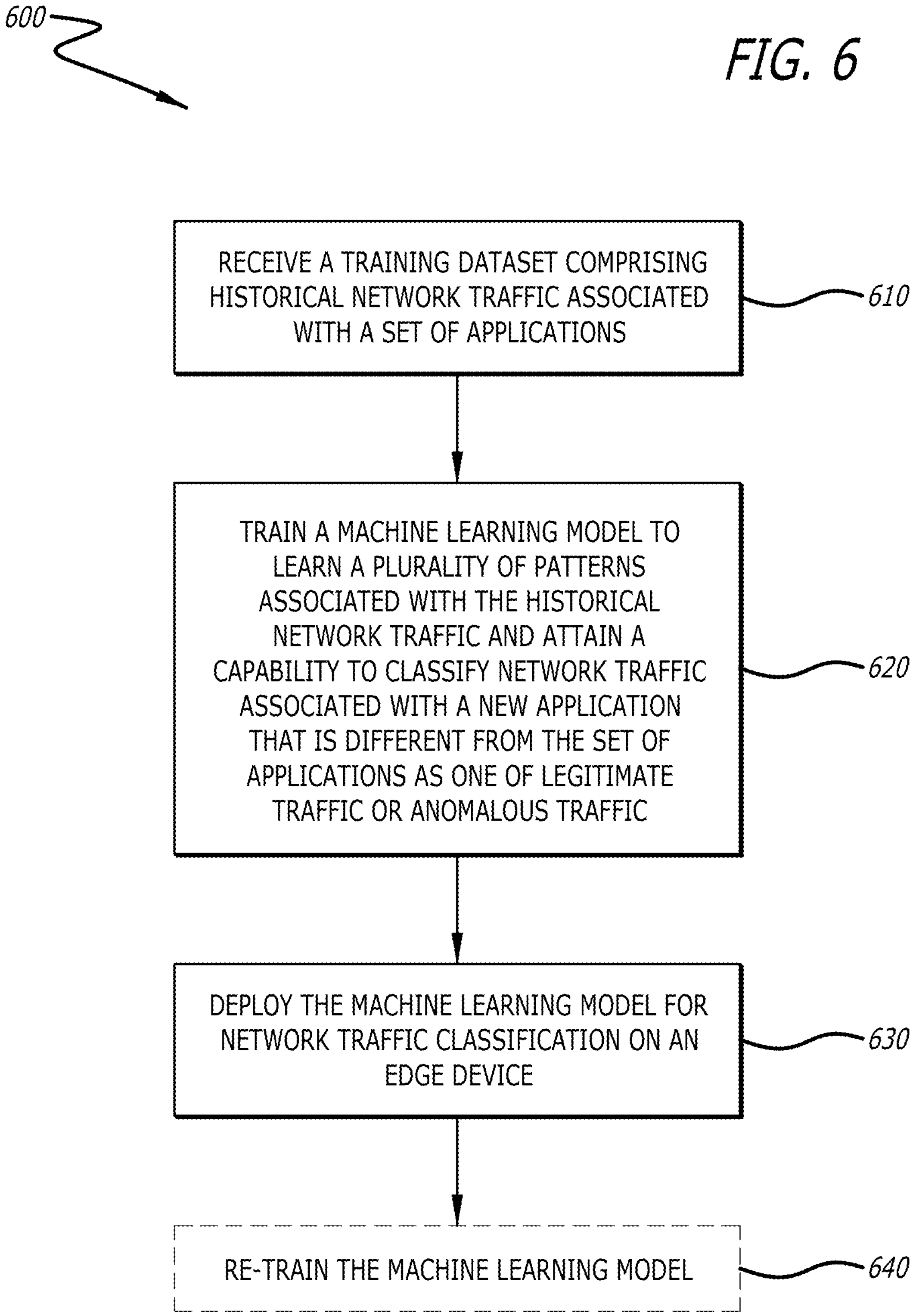
FIG. 6 is a flowchart depicting a process for training a machine learning model to adaptively classify network traffic associated with a new application in accordance with various embodiments of the disclosure.

Referring to FIG. 6, a flowchart depicting a process 600 for training a machine learning model to adaptively classify network traffic associated with a new application in accordance with various embodiments of the disclosure is shown. In many embodiments, the process 600 may receive a training dataset comprising historical network traffic associated with a set of applications (block 610). The set of applications may include, for example, web applications, streaming applications, social media applications, online and cloud-rendered gaming applications, instant messaging applications, remote desktop applications, cloud-based applications, or the like. The historical network traffic may include, for example, various types of data such as legitimate traffic data, DDoS traffic data, malware traffic data, web traffic data, or the like, that represent behavior and characteristics of the network traffic generated by the applications. The data associated with the historical network traffic, herein referred to as "historical network traffic data," may be utilized for training a machine learning model deployed on an edge device to distinguish between legitimate traffic and anomalous traffic or to identify patterns of behavior associated with specific applications. The historical network traffic data may include data associated with individual packets that constitute the network traffic. For example, the historical network traffic data may include a timestamp indicating an exact time a packet was transmitted or received via a network, packet size indicating the type of application, a source address, a destination address, source ports, destination ports, protocol types, flags, packet count, or the like. In a number of embodiments, the historical network traffic data may include, for example, flow duration, number of packets per flow, bytes per flow, flow start and end times, session count, traffic volume, traffic rate, byte distribution, round-trip time, or the like. In a variety of embodiments, the process 600 may obtain the historical network traffic data from network monitoring tools, packet capture files, or flow data.

In various embodiments, the process 600 may train a machine learning model to learn a plurality of patterns associated with the historical network traffic and attain a capability to classify network traffic associated with a new application that is different from the set of applications as one of legitimate traffic or anomalous traffic (block 620). The process 600 may train the machine learning model based on the training dataset. In more embodiments, the new application may correspond to a zero-day application that is unknown to the machine learning model. Based on the training, the machine learning model may learn the plurality of patterns associated with the historical network traffic. Consequently, the machine learning model may attain the capability to classify network traffic associated with the new application as legitimate traffic or anomalous traffic based on the learned patterns. In additional embodiments, the machine learning model may be configured as a neural network-based model that can robustly classify network traffic, while overcoming the specific challenges of protocol and application diversity, variability in patterns, and the emergence of zero-day application traffic. In further embodiments, the machine learning model may generalize from known applications to accurately identify new or unseen patterns generated by the new application and accurately classify the network traffic therefrom. In still more embodiments, the process 600 may train the machine learning model by utilizing contrastive learning on the machine learning model. Based on the contrastive learning, the machine learning model may learn to distinguish between a plurality of traffic types in the historical network traffic and learn the plurality of patterns associated with the historical network traffic.

In still further embodiments, the process 600 may deploy the machine learning model for network traffic classification on an edge device (block 630). The edge device is, for example, an access point. In still additional embodiments, the machine learning model may be implemented with a dedicated architecture including a specific structure, for example, an NPU/tensor structure, for operation on the edge device at the edge of the network. In some more embodiments, the machine learning model may operate on the edge device, while being scalable, highly accurate, and adaptable.

In yet various embodiments, the process 600 may optionally re-train the machine learning model (block 640). In yet more embodiments, the process 600 may re-train the machine learning model based on one or more confirmed instances of the classification. In still yet more embodiments, the process 600 may re-train the machine learning model based on reinforcement learning with user feedback and/or machine scoring. To maintain high accuracy and adapt to new patterns associated with network traffic generated by new applications, the process 600 may implement a continuous learning approach. In many further embodiments, the continuous learning approach may involve periodically retraining the machine learning model on new network traffic data. In many additional embodiments, the continuous learning approach may employ online learning techniques to update the machine learning model in real time. The machine learning model may be configured to continuously learn and adapt to deal with zero-day application traffic effectively. By periodically updating the machine learning model with new network traffic data including, for example, confirmed instances of zero-day application traffic once identified, the machine learning model can refine its classification capabilities over time. This periodic update of the machine learning model may ensure that the machine learning model remains effective even as new applications and protocols emerge and as the landscape of the network traffic evolves.

In still yet further embodiments, testing of the machine learning model may be achieved by injecting network traffic that is associated with a new application, for example, a zero-day application, and that has been characterized on a high-dimensional system with a large number of parameters, into the machine learning model. The speed of learning, that is, the rate at which the System Under Test (SUT) learns the injected network traffic may be measured. Principal Component Analysis (PCA) or similar techniques may be utilized to progressively reduce a dimension count of the injected network traffic, thereby allowing the network traffic to slowly and progressively resemble the structure of network traffic in a first phase, and introduce a rougher or less subtle deviation from known traffic. In a classical ANN implementation, a linear (along a measurable curve) relation may be observed between compression (dimensions reduction) and performances of the machine learning model. In the embodiments described herein which may extend beyond this first standard ANN world and belong to a second world of LLMs, the characterization may not be strictly linearly dimensional, because the network traffic flow may be profiled in a multidimensional sequence, and the network traffic profile may not be linearly affected by the dimension reduction. The performances of LLM implementations may be expressed in the number of tokens per second, which translates into the length of the flow window that the SUT can analyze, and the speed at which the recognition may be performed (given a particular length). However, due to the lack of linearity mentioned above, the test suggested above results in performances to be maintained as the length of the flow increases, until steps where the performances reduce (by step, instead of linearly), then the performances reduce with that pattern until a lower plateau.

Although a specific embodiment for a process 600 for training a machine learning model to adaptively classify network traffic associated with a new application suitable for carrying out the various steps, processes, methods, and operations described herein is discussed with respect to FIG. 6, any of a variety of systems and/or processes may be utilized in accordance with embodiments of the disclosure. For example, in addition to contrastive learning and reinforcement learning, the machine learning model may be trained to adaptively classify network traffic associated with a new application by utilizing other machine learning techniques such as supervised learning where the machine learning model is trained on labeled network traffic data, semi-supervised learning, transfer learning, few-shot learning, active learning, or the like. The elements depicted in FIG. 6 may also be interchangeable with other elements of FIGS. 1-5 and FIGS. 7-10 as required to realize a particularly desired embodiment.

Figure 7:
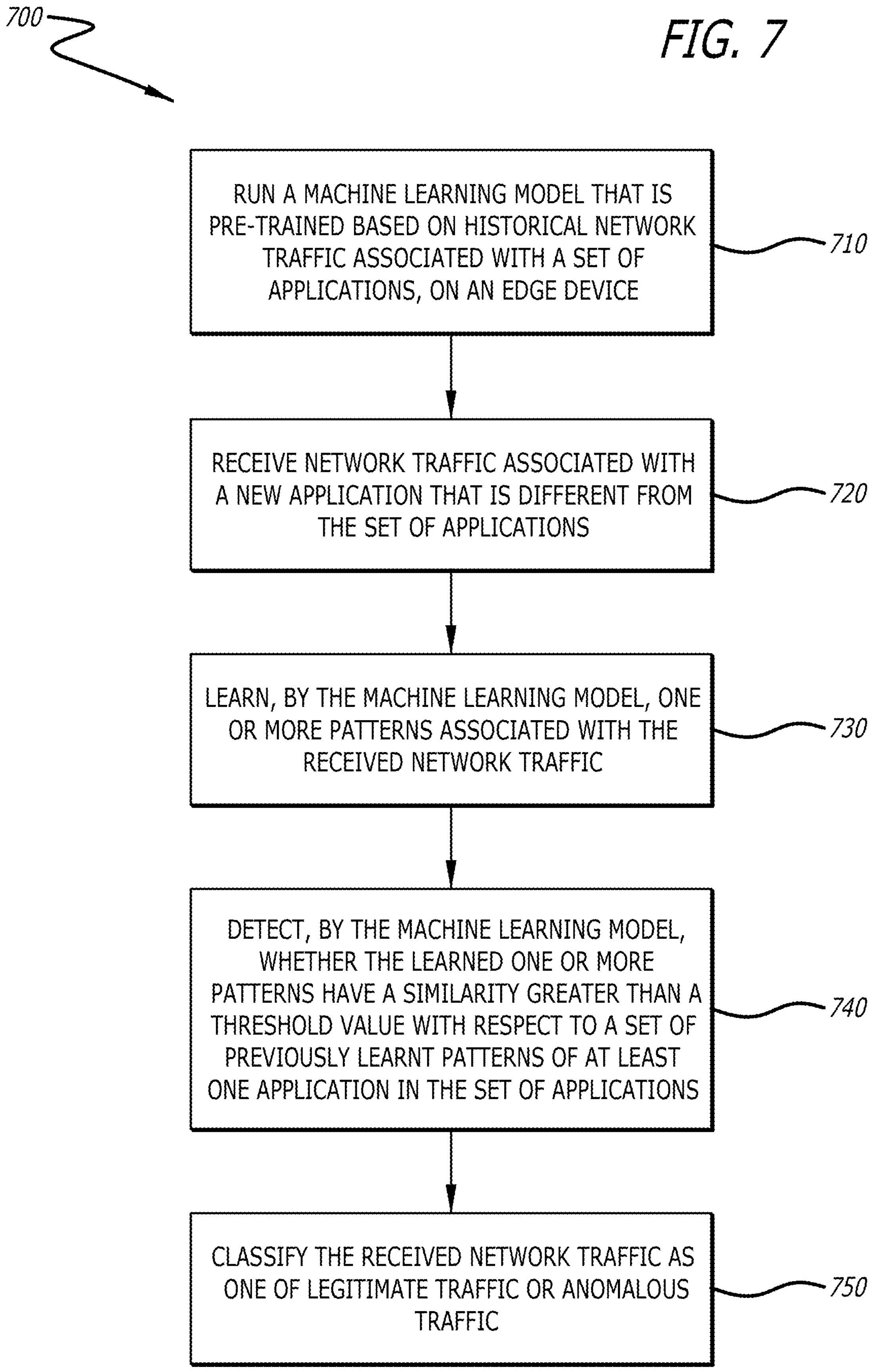
FIG. 7 is a flowchart depicting a process for adaptively classifying network traffic associated with a new application in accordance with various embodiments of the disclosure.

Referring to FIG. 7, a flowchart depicting a process 700 for adaptively classifying network traffic associated with a new application in accordance with various embodiments of the disclosure is shown. In many embodiments, the process 700 may run a machine learning model that is pre-trained based on historical network traffic associated with a set of applications, on an edge device (block 710). The historical network traffic may include, for example, various types of data such as legitimate traffic data, DDoS traffic data, malware traffic data, web traffic data, or the like, that represent behavior and characteristics of the network traffic generated by the applications. The set of applications may include, for example, web applications, streaming applications, social media applications, online and cloud-rendered gaming applications, instant messaging applications, remote desktop applications, cloud-based applications, or the like. In a number of embodiments, the machine learning model may be pre-trained to learn a plurality of patterns associated with the historical network traffic and may have attained a capability to classify network traffic associated with a new application that is different from the set of applications as one of legitimate traffic or anomalous traffic. In a variety of embodiments, the machine learning model may be pre-trained with contrastive learning to distinguish between a plurality of traffic types in the historical network traffic.

In various embodiments, the pre-trained machine learning model may be implemented with a dedicated architecture including a specific structure, for example, a neural processing unit/tensor structure, for running on the edge device at the edge of the network. In more embodiments, the edge device may be an access point. In additional embodiments, running the machine learning model on the edge device may facilitate the processing of network traffic data locally on the edge device, which may reduce the time for transmitting the network traffic data to the central server or the cloud, thereby substantially improving response times and enabling real-time decision-making. Moreover, running the machine learning model on the edge device may reduce the need for expensive cloud infrastructure and reduce the strain on central servers, allowing for better scalability in large-scale deployments.

In further embodiments, the process 700 may receive network traffic associated with a new application that is different from the set of applications (block 720). In still more embodiments, the new application may correspond to a zero-day application that is unknown to the machine learning model. The zero-day application may refer to a newly developed or updated application or software having vulnerabilities or security flaws that may be unknown to a vendor or a developer at the time they are discovered or exploited by attackers. Since the zero-day application is unknown or has an undisclosed vulnerability, its network traffic may exhibit some unusual or anomalous patterns associated, for example, with uncommon or non-standard protocols, malicious payloads, packets with malformed headers, non-compliant field lengths, or unusual values, high frequency traffic, outbound Command and Control (C2) traffic, abnormal server responses, or the like. The network traffic associated with the new application may be encapsulated in multiple packets.

In still further embodiments, the process 700 may learn, by the machine learning model, one or more patterns associated with the received network traffic (block 730). In still additional embodiments, the machine learning model may learn one or more patterns associated with the received network traffic by utilizing a transformer encoder. The transformer encoder may receive a sequence of embeddings associated with a sequence of tokens representing a plurality of features of at least one packet extracted from the received network traffic. The transformer encoder may generate, for the packet(s), a high-dimensional representation based on the sequence of embeddings, and apply one or more transformations to the high-dimensional representation to learn the one or more patterns of the received network traffic. In some more embodiments, the machine learning model learns the one or more patterns associated with the received network traffic based on the contrastive learning.

In yet various embodiments, the process 700 may detect, by the machine learning model, whether the learned one or more patterns have a similarity greater than a threshold value with respect to a set of previously learned patterns of at least one application in the set of applications (block 740). The pre-trained machine learning model may generalize from known applications to accurately identify new or unseen patterns generated by the new application and accurately classify the network traffic therefrom. In yet more embodiments, the process 700 may compare the learned one or more patterns of the received network traffic with the previously learned patterns including, for example, legitimate traffic patterns, anomalous traffic patterns, and attack patterns, if known. The process 700 may perform this comparison by utilizing similarity metrics, for example, a cosine similarity, Euclidean distance, a dot product, or the like. For example, the process 700 may measures a cosine of an angle between two vectors associated with the learned pattern and a previously learned pattern. If the vectors are substantially similar, that is, close to 1, the learned pattern is likely similar to the previously learned pattern. In an additional example, the process 700 may measure a straight-line distance between the two vectors in a high-dimensional space, whereby a small distance may indicate a high similarity, while a large distance may indicate a greater divergence and a potential anomaly. In a further example, the process 700 may utilize a dot product of the two vectors to measure their similarity, whereby a higher value indicates more similarity. Once the similarity is determined, the process 700 may utilize a threshold value to determine whether the similarity is high enough to classify the network traffic as similar to a previously learned pattern that may be legitimate or anomalous.

In still yet more embodiments, the process 700 may classify the received network traffic as one of legitimate traffic or anomalous traffic (block 750). The process 700 may classify the received network traffic as one of legitimate traffic or anomalous traffic based on the detection of whether the learned one or more patterns have a similarity greater than a threshold value with respect to the set of previously learned patterns of at least one application in the set of applications. If the similarity between the learned one or more patterns associated with the received network traffic and the set of previously learned patterns of the at least one application is greater than the threshold value, the process 700 may classify the received network traffic as legitimate traffic. If the similarity is less than the threshold value, the process 700 may classify and flag the received network traffic as anomalous traffic. The anomalous traffic may include threats or updated software. The machine learning model may output the network traffic classification based on the similarity.

Although a specific embodiment for a process 700 for adaptively classifying network traffic associated with a new application suitable for carrying out the various steps, processes, methods, and operations described herein is discussed with respect to FIG. 7, any of a variety of systems and/or processes may be utilized in accordance with embodiments of the disclosure. For example, instead of a single pre-trained machine learning model running on the edge device, multiple different pre-trained machine learning models may be selectively run on the edge device to classify the received network traffic as legitimate traffic or anomalous traffic. The elements depicted in FIG. 7 may also be interchangeable with other elements of FIGS. 1-6 and FIGS. 8-10 as required to realize a particularly desired embodiment.

Figure 8:
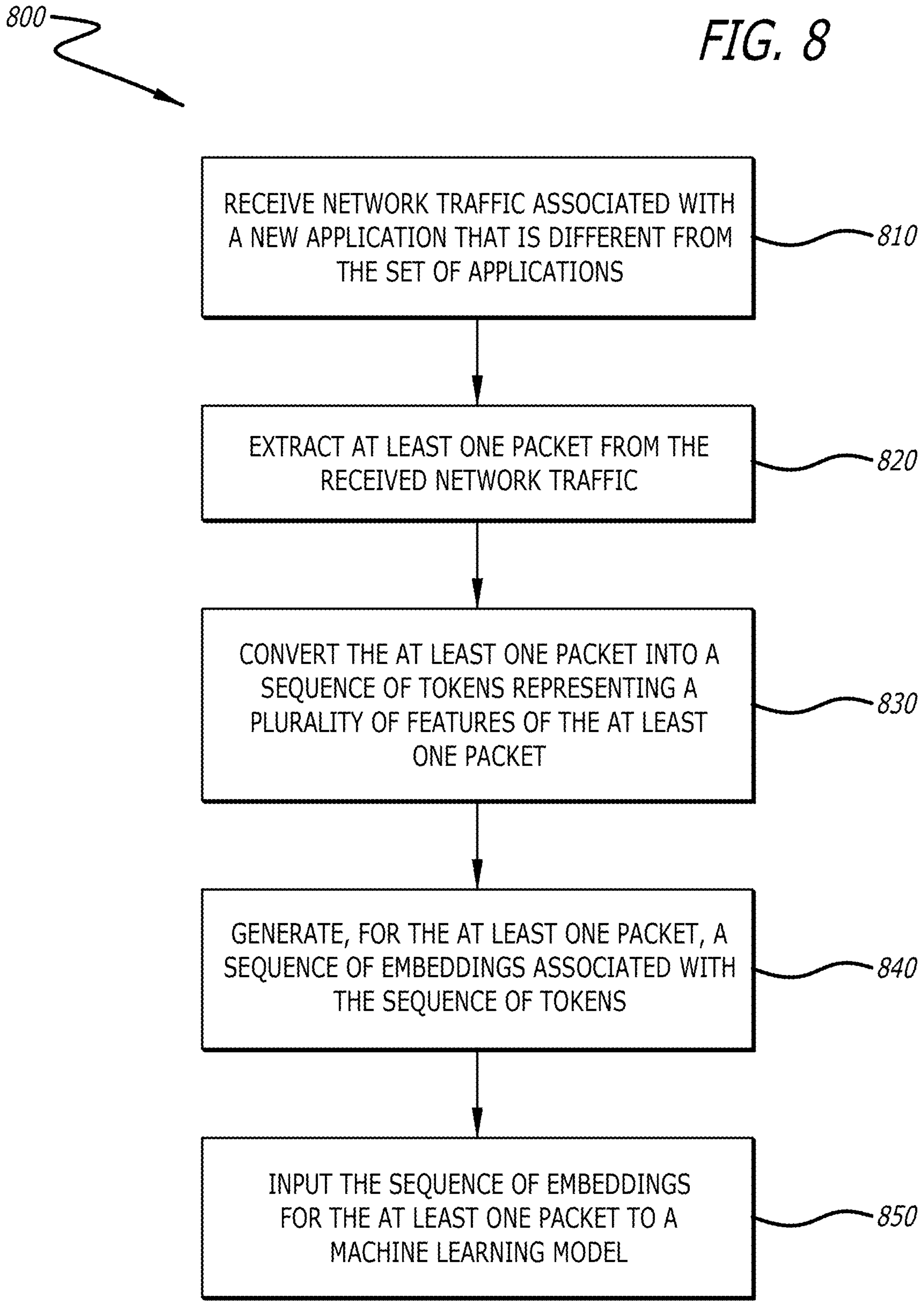
FIG. 8 is a flowchart depicting a process for tokenizing network traffic associated with a new application in accordance with various embodiments of the disclosure.

Referring to FIG. 8, a flowchart depicting a process 800 for tokenizing network traffic associated with a new application in accordance with various embodiments of the disclosure is shown. In many embodiments, the process 800 may receive network traffic associated with a new application that is different from the set of applications (block 810). In a number of embodiments, the new application may correspond to a zero-day application that is unknown to a pre-trained machine learning model. Since the zero-day application is unknown or has an undisclosed vulnerability, its network traffic may exhibit some unusual or anomalous patterns associated, for example, with uncommon or non-standard protocols, malicious payloads, packets with malformed headers, non-compliant field lengths, or unusual values, high frequency traffic, outbound C2 traffic, abnormal server responses, or the like. The network traffic associated with the new application may be encapsulated in multiple packets. The set of applications from which the new application is different may include, for example, web applications, streaming applications, social media applications, online and cloud-rendered gaming applications, instant messaging applications, remote desktop applications, cloud-based applications, or the like. In a variety of embodiments, the process 800 may receive the network traffic via an input module deployed on an edge device, for example, an access point. The input module may be configured to execute preprocessing and tokenization functions on the received network traffic in the edge device.

In various embodiments, the process 800 may extract at least one packet from the received network traffic (block 820). In more embodiments, the process 800 may extract at least one packet from the received network traffic by utilizing packet capture tools. The packet capture tools may include, for example, Network-Based Application Recognition (NBAR) applications, network traffic analyzers such as Wireshark® of the Wireshark Foundation, tcpdump, or Packet Capture (PCAP) libraries. In additional embodiments, the process 800 may utilize Deep Packet Inspection (DPI) techniques to analyze the payload of the packets and determine the application or protocol being utilized. In further embodiments, the process 800 may extract at least one packet from the received network traffic in the form of PCAP files, which store raw packets transmitted over a network.

In still more embodiments, the process 800 may convert the at least one packet into a sequence of tokens representing a plurality of features of the at least one packet (block 830). The plurality of features may include, for example, a source address, a destination address, one or more port numbers, a packet size, one or more protocol types, one or more timestamps, and one or more bytes of a payload. In still further embodiments, the plurality of features may be categorized, for example, as numerical features, categorical features, and textual or byte-level features. The numerical features may include, for example, packet size, a Time-To-Live (TTL) value, a sequence number in a TCP packet, IP header length, port numbers, or the like. The categorical features may include, for example, protocol type, TCP flags, IP version, or the like.

The packets extracted from the received network traffic need to be preprocessed into a format suitable for a neural network. The process 800 may preprocess the at least one packet into the suitable format by converting the at least one packet into the sequence of tokens. In still additional embodiments, the process 800 may utilize the numerical features in their raw numerical form. In some more embodiments, the process 800 may convert the categorical features into the suitable format by utilizing encoding techniques such as one-hot encoding, label encoding, embedding, or the like. In yet various embodiments, the process 800 may convert the textual or byte-level features by utilizing encoding techniques such as byte encoding. Once the features are encoded, the process 800 may arrange the encoded features into a sequence, for example, a structured sequence. In an example, the process 800 may convert each packet in a network flow as a vector of its feature tokens, herein referred to as a sequence of tokens. In the case of TCP traffic, for example, the sequence of tokens may include fields such as source address, destination address, source port, destination port, flags, and payload size.

In yet more embodiments, the process 800 may generate, for the at least one packet, a sequence of embeddings associated with the sequence of tokens (block 840). The process 800 may execute tokenization to generate the sequence of embeddings. In still yet more embodiments, the process 800 may execute tokenization similar to NLP. In many further embodiments, the process 800 may map each token to a dense vector representation through an embedding layer. The embedding layer may refer to a trainable lookup table that maps each token represented by an integer index to a corresponding dense vector. The size of this dense vector may be an embedding dimension, for example, 128, 256, 512, etc. The process 800 may utilize each token in the sequence of tokens as an index to retrieve the corresponding vector from the embedding layer, similar to how words in NLP models are mapped to word embeddings.

In many additional embodiments, the process 800 may input the sequence of embeddings for the at least one packet to the pre-trained machine learning model (block 850). For packet-specific features such as IP addresses or port numbers, custom embeddings may be trained as part of the machine learning model. In still yet further embodiments, the process 800 may input the sequence of embeddings to a transformer encoder of the machine learning model. In the transformer encoder, the sequence of embeddings may undergo positional encoding prior to being proceed by subsequent transformer layers including, for example, a multi-head attention layer and a feed-forward neural network layer.

Although a specific embodiment for a process 800 for tokenizing network traffic associated with a new application suitable for carrying out the various steps, processes, methods, and operations described herein is discussed with respect to FIG. 8 any of a variety of systems and/or processes may be utilized in accordance with embodiments of the disclosure. For example, in still yet additional embodiments, if the network traffic is sequential, where a sequence of packets forms a network flow, the packet features can be arranged as a sequence of tokens, with each packet forming one token in the sequence. The elements depicted in FIG. 8 may also be interchangeable with other elements of FIGS. 1-7 and FIGS. 9-10 as required to realize a particularly desired embodiment.

Figure 9:
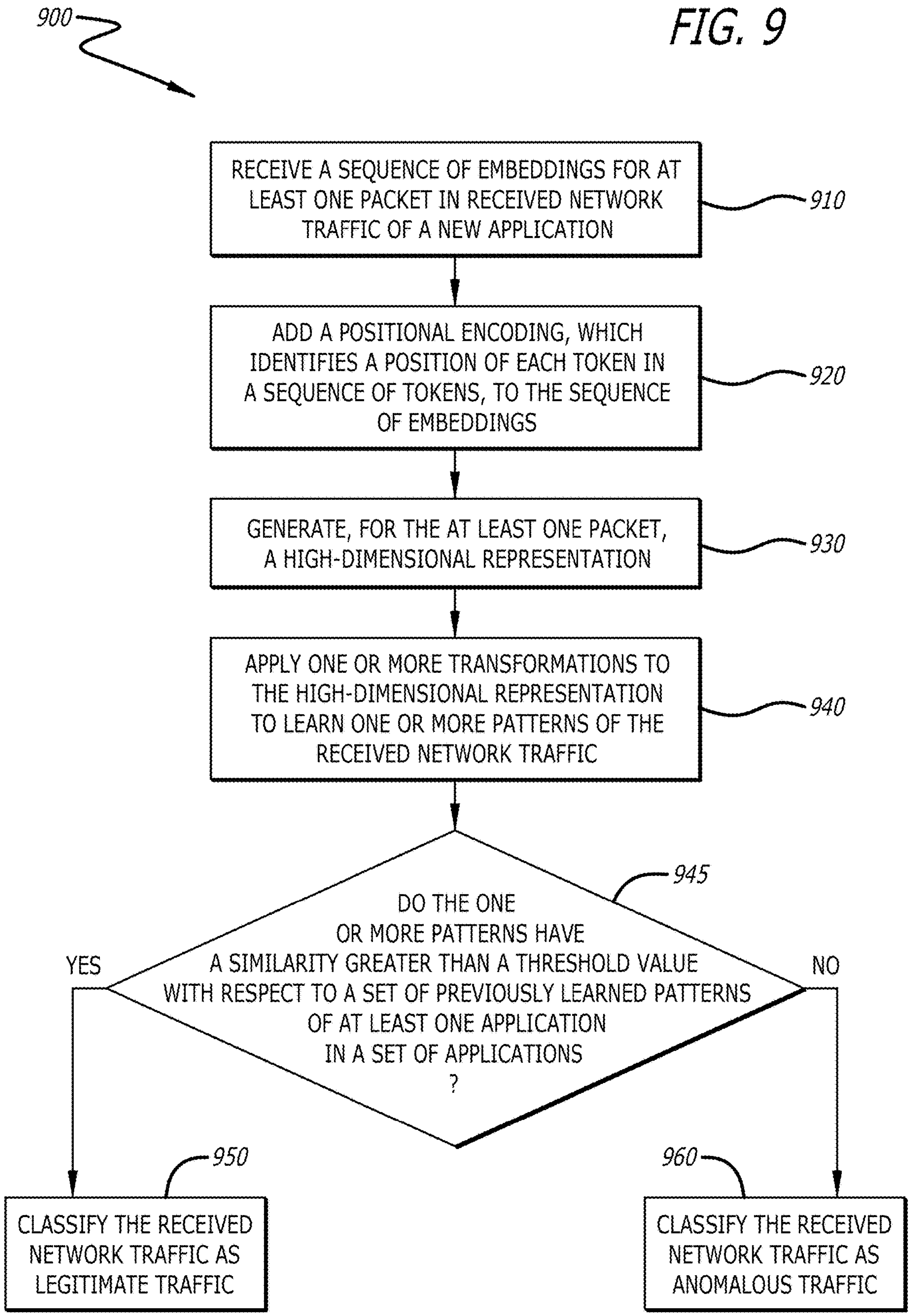
FIG. 9 is a flowchart depicting a process for classifying network traffic associated with a new application in accordance with various embodiments of the disclosure.

Referring to FIG. 9, a flowchart depicting a process 900 for classifying network traffic associated with a new application in accordance with various embodiments of the disclosure is shown. In several embodiments, the process 900 may receive a sequence of embeddings for at least one packet in received network traffic of a new application (block 910). In several more embodiments, the new application may correspond to a zero-day application that is unknown to a pre-trained machine learning model deployed on an edge device, for example, an access point. The sequence of embeddings may be associated with the sequence of tokens representing a plurality of features of the at least one packet. The plurality of features may include, for example, a source address, a destination address, one or more port numbers, a packet size, one or more protocol types, one or more timestamps, and one or more bytes of a payload. The process 900 may receive the sequence of embeddings as an input to the pre-trained machine learning model. In numerous embodiments, the pre-trained machine learning model may include an encoder and a decoder. The process 900 may receive the sequence of embeddings at the encoder, from an input module deployed on the edge device.

In numerous additional embodiments, the process 900 may add a positional encoding, which identifies a position of each token in a sequence of tokens, to the sequence of embeddings (block 920). As transformers do not have a notion of sequence order in their architecture, the positional encoding may be added to the sequence of embeddings to convey positional information. Positional encoding may assist the machine learning model to understand which token comes first, second, third, etc., in a sequence. The process 900 may add the positional encoding to the sequence of embeddings at the encoder.

In further additional embodiments, the process 900 may generate, for the at least one packet, a high-dimensional representation (block 930). The process 900 may generate, for the at least one packet, the high-dimensional representation based on the sequence of embeddings. In many embodiments, the process 900 may implement an attention layer, for example, a multi-head attention layer, at the encoder for generating the high-dimensional representation based on the sequence of embeddings. The multi-head attention layer may include a plurality of attention heads. Each attention head of the plurality of attention heads may be configured to generate one or more attention weights, indicating a relevance each embedding in the sequence of embeddings has with respect to each other embedding in the sequence of embeddings. The process 900 may generate the high-dimensional representation based on the one or more attention weights generated by each attention head. In a number of embodiments, the high-dimensional representation may be a matrix of the same dimensions as the input, that is, the sequence of embeddings, where each row in the matrix may correspond to an updated high-dimensional representation of the at least one packet.

In a variety of embodiments, the process 900 may apply one or more transformations to the high-dimensional representation to learn one or more patterns of the received network traffic (block 940). The process 900 may implement a neural network, for example, a feed-forward neural network, for applying one or more transformations to the high-dimensional representation to allow the machine learning model to learn one or more patterns of the received network traffic. The feed-forward neural network may include one or more fully connected layers, often followed by activation functions such as ReLU or GELU. In various embodiments, the process 900 may apply the feed-forward neural network independently and element-wise to the high-dimensional representation of each packet to transform the high-dimensional representation into a higher-level feature space, further refining the corresponding high-dimensional representation and applying non-linear transformations to extract higher-level features from the output of the multi-head attention layer.

In more embodiments, the process 900 may determine whether the one or more patterns have a similarity greater than a threshold value with respect to a set of previously learned patterns of at least one application in a set of applications (block 945). The process 900 may receive the one or more patterns associated with the received network traffic from the feed-forward neural network, at the decoder, and detect whether the received pattern(s) has a similarity greater than a threshold value with respect to a set of previously learned patterns of at least one application. The pre-trained machine learning model may generalize from known applications to accurately identify new or unseen patterns generated by the new application and accurately classify the network traffic therefrom. In additional embodiments, the process 900 may compare the one or more patterns of the received network traffic with the previously learned patterns. The process 900 may perform this comparison by utilizing similarity metrics, for example, a cosine similarity, Euclidean distance, a dot product, or the like. Once the similarity is determined, the process 900 may utilize a threshold value to determine whether the similarity is high enough to classify the network traffic as similar to a previously learned pattern that may be legitimate or anomalous.

In further embodiments, in response to determining that the one or more patterns have a similarity greater than a threshold value with respect to a set of previously learned patterns of at least one application in a set of applications, the process 900 may classify the received network traffic as legitimate traffic (block 950). Legitimate traffic may include, for example, packets of data from standard user activities, routine system processes, and communications that align with an intended use of a network. The process 900 may classify the received network traffic as legitimate traffic at the decoder based on the detection that the one or more patterns have a similarity greater than the threshold value with respect to the set of previously learned patterns of at least one application in the set of applications. If the similarity between the one or more patterns associated with the received network traffic and the set of previously learned patterns of the at least one application is greater than the threshold value, the process 900 may classify the received network traffic as legitimate traffic.

However, in still more embodiments, in response to determining that the one or more patterns do not have a similarity greater than a threshold value with respect to a set of previously learned patterns of at least one application in a set of applications, the process 900 may classify the received network traffic as anomalous traffic (block 960). Anomalous traffic may include, for example, data associated with unexpected spikes in traffic, unusual data sources or destinations, or activities that may not align with typical user behavior and may deviate from normal patterns, often indicating unusual or suspicious behavior. The process 900 may classify the received network traffic as anomalous traffic at the decoder based on the detection that the one or more patterns have a similarity less than the threshold value with respect to the set of previously learned patterns of at least one application in the set of applications. If the similarity between the one or more patterns associated with the received network traffic and the set of previously learned patterns of the at least one application is less than the threshold value, the process 900 may classify the received network traffic as anomalous traffic.

Although a specific embodiment for a process 900 for classifying network traffic associated with a new application suitable for carrying out the various steps, processes, methods, and operations described herein is discussed with respect to FIG. 9, any of a variety of systems and/or processes may be utilized in accordance with embodiments of the disclosure. For example, in still further embodiments, the threshold value utilized may be static or dynamic in nature. In still additional embodiments, the threshold values may be adjusted based on a variety of criteria including, for example, the amount of processing resources available for network traffic classification, network requirements, or the like. The elements depicted in FIG. 9 may also be interchangeable with other elements of FIGS. 1-8 and FIG. 10 as required to realize a particularly desired embodiment.

Figure 10:
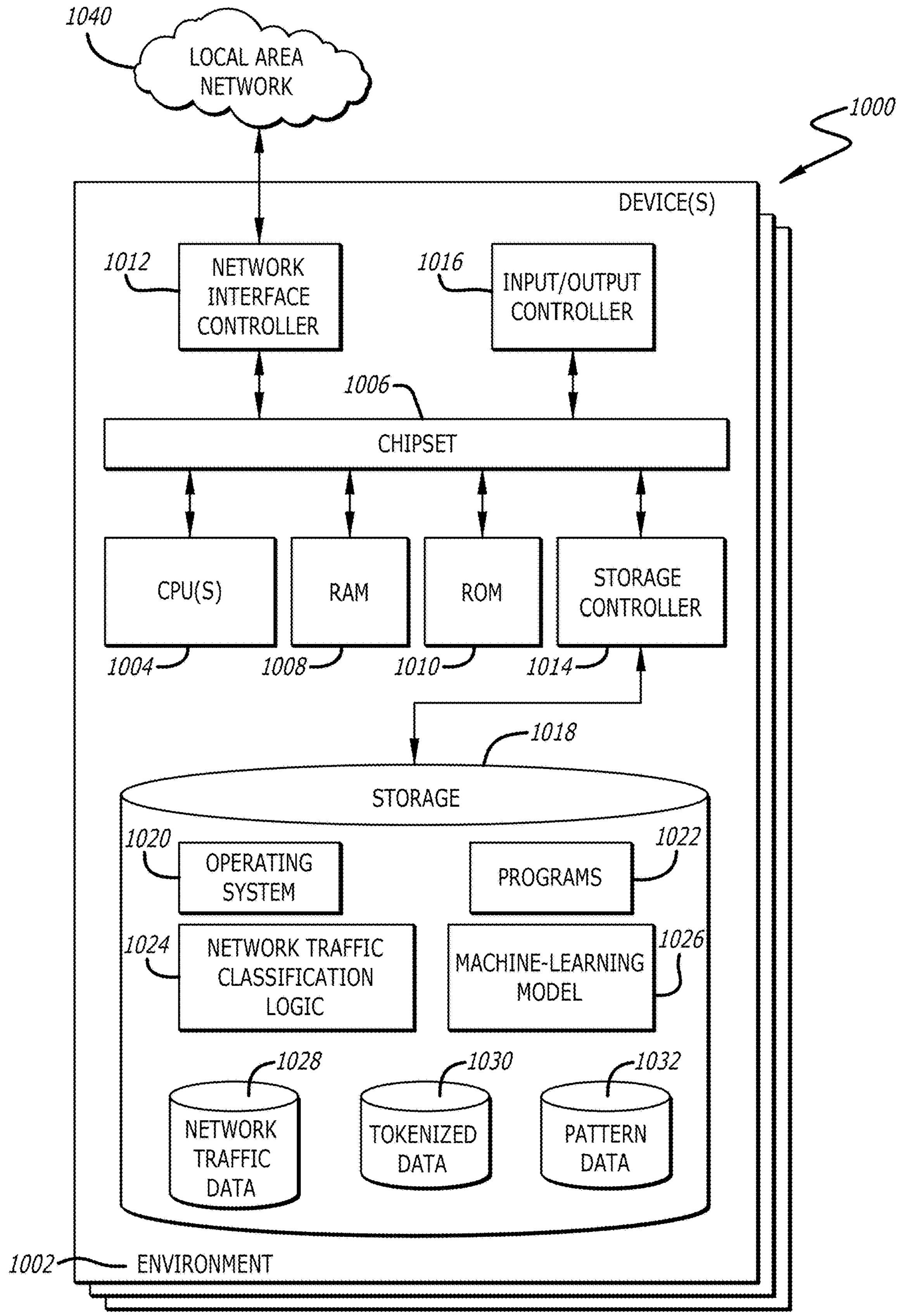
FIG. 10 is a conceptual block diagram of a device suitable for configuration with a network traffic classification logic for implementing the functionality and various embodiments of the disclosure.

Referring to FIG. 10, a conceptual block diagram of a device 1000 suitable for configuration with a network traffic classification logic 1024 for implementing the functionality and various embodiments of the disclosure is shown. The embodiment of the conceptual block diagram depicted in FIG. 10 can illustrate a conventional server computer, a workstation, a desktop computer, a laptop, a tablet, a network appliance, an electronic reader (e-reader), a smartphone, or other computing device, and can be utilized to execute any of the application and/or logic components presented herein. The device 1000 may, in some examples, correspond to a physical device or to a virtual resource described herein. The device 1000 can be a network device, for example, an access point, a router, a switch, or any other edge device in accordance with various embodiments of the disclosure.

In many embodiments, the device 1000 may include an environment 1002 such as a baseboard or a "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In a number of embodiments, one or more processors 1004, such as, but not limited to, central processing units (CPUs) can be configured to operate in conjunction with a chipset 1006. The processor(s) 1004 can be standard programmable CPUs that perform arithmetic and logical operations necessary for the operation of the device 1000.

In a variety of embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a Random-Access Memory (RAM) 1008, which can be utilized as the main memory in the device 1000 in some embodiments. The chipset 1006 can further be configured to provide an interface to a computer-readable storage medium such as a Read-Only Memory (ROM) 1010 or a Non-Volatile RAM (NVRAM) for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a Network Interface Controller (NIC) 1012, which may include a gigabit Ethernet adapter or similar component. The NIC 1012 can be capable of connecting the device 1000 to other devices over the network 1040. It is contemplated that multiple NICs 1012 may be present in the device 1000, connecting the device 1000 to other types of networks and remote systems.

In more embodiments, the device 1000 can be connected to a storage 1018 that provides non-volatile storage for data accessible by the device 1000. The storage 1018 can, for example, store an operating system 1020, applications or programs 1022, network traffic data 1028, tokenized data 1030, and pattern data 1032, which are described in greater detail below. The storage 1018 can be connected to the environment 1002 through a storage controller 1014 connected to the chipset 1006. In additional embodiments, the storage 1018 can include one or more physical storage units. The storage controller 1014 can interface with the physical storage units through a Serial Advanced Technology Attachment (SATA) interface, a Fiber Channel (FC) interface, a Serial Attached SCSI (SAS) interface, where SCSI refers to a Small Computer System Interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology utilized to implement the physical storage units, whether the storage 1018 is characterized as primary or secondary storage, and the like. For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to the device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc-ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be utilized to store the desired information in a non-transitory fashion.

As mentioned briefly above, the storage 1018 can store an operating system 1020 utilized to control the operation of the device 1000. According to one embodiment, the operating system 1020 includes the LINUX operating system. According to another embodiment, the operating system 1020 includes the Windows® server operating system from Microsoft Corporation of Redmond, Washington. According to further embodiments, the operating system 1020 can include the UNIX operating system or one of its variants. It should be appreciated that other operating systems can also be utilized. The storage 1018 can store other system or application programs and data utilized by the device 1000.

In still more embodiments, the storage 1018 or other computer-readable storage media is encoded with computer-executable instructions which, when loaded into the device 1000, may transform the device 1000 from a general-purpose computing system into a special-purpose computer capable of implementing the embodiments described herein. These computer-executable instructions may be stored as applications or programs 1022 and transform the device 1000 by specifying how the processor(s) 1004 can transition between states, as described above. In still further embodiments, the device 1000 has access to computer-readable storage media storing computer-executable instructions which, when executed by the device 1000, perform the various processes described above with regard to FIGS. 1-10. In still additional embodiments, the device 1000 can also include computer-readable storage media having instructions stored thereupon for performing any of the other computer-implemented operations described herein.

In some more embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 may not include all of the components shown in FIG. 10, and can include other components that are not explicitly shown in FIG. 10, or may utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In yet various embodiments, the device 1000 can include a network traffic classification logic 1024 that may be responsible for adaptively classifying network traffic associated with a new application. In yet more embodiments, the network traffic classification logic 1024 may operate in the edge device. In embodiments where the device 1000 corresponds to the edge device, for example, the access point, the network traffic classification logic 1024 can be configured to perform various operations such as, but not limited to, receiving a training dataset comprising historical network traffic associated with a set of applications; training a machine learning model based on the training dataset, wherein, based on the training, the machine learning model learns a plurality of patterns associated with the historical network traffic and attains a capability to classify network traffic associated with a new application that is different from the set of applications as one of legitimate traffic or anomalous traffic; and deploying the machine learning model for network traffic classification on the edge device. In still yet more embodiments where the device 1000 corresponds to the edge device, the network traffic classification logic 1024 can be configured to perform various operations such as, but not limited to, running a machine learning model that is pre-trained based on historical network traffic associated with a set of applications, on the edge device; receiving network traffic associated with a new application that is different from the set of applications; and classifying the received network traffic as one of legitimate traffic or anomalous traffic utilizing the machine learning model, wherein classifying the received network traffic comprises: learning, by the machine learning model, one or more patterns associated with the received network traffic; and detecting, by the machine learning model, whether the learned one or more patterns have a similarity greater than a threshold value with respect to a set of previously learned patterns of at least one application in the set of applications, wherein the received network traffic is classified as one of the legitimate traffic or the anomalous traffic based on the detection.

Those skilled in the art will recognize that the network traffic classification logic 1024 can include various hardware and/or software deployments and can be configured in a variety of ways. In many additional embodiments, the network traffic classification logic 1024 can be configured as a standalone device, exist as a logic in another network device, be distributed among various network devices operating in tandem, or remotely operated as part of a cloud-based network management tool. In still yet further embodiments, one or more servers can be configured with the network traffic classification logic 1024 or can otherwise operate as the network traffic classification logic 1024. In still yet additional embodiments, the network traffic classification logic 1024 may operate on one or more servers connected to a communication network, for example, the Internet. The communication network can include wired networks or wireless networks. The network traffic classification logic 1024 can be provided as a cloud-based service that can service remote networks, such as, but not limited to, a deployed network. Further, in several embodiments, the network traffic classification logic 1024 may be operated as a distributed logic across multiple network devices. In an embodiment, the controller can operate as the network traffic classification logic 1024 or may have multiple devices operate as the network traffic classification logic 1024 in a distributed manner.

In several more embodiments, the storage 1018 can include network traffic data 1028. The network traffic data 1028 may relate to data representative of network traffic flows. The network traffic data 1028 may include data associated with individual packets that constitute the network traffic. For example, the network traffic data 1028 may include a timestamp indicating an exact time a packet was transmitted or received via a network, packet size indicating the type of application, a source address, a destination address, source ports, destination ports, protocol types, flags, packet count, or the like. In numerous embodiments, the network traffic data 1028 may include, for example, flow duration, number of packets per flow, bytes per flow, flow start and end times, session count, traffic volume, traffic rate, byte distribution, round-trip time, or the like. In various embodiments, the network traffic data 1028 may be preprocessed and tokenized before being input to the machine learning model 1026.

In numerous additional embodiments, the storage 1018 can include tokenized data 1030. The tokenized data 1030 may relate to data representative of the sequence of tokens representing a plurality of features of at least one packet extracted from the network traffic data. The plurality of features may include, for example, a source address, a destination address, one or more port numbers, a packet size, one or more protocol types, one or more timestamps, and one or more bytes of a payload. In further additional embodiments, the tokenized data 1030 may include a sequence of embeddings associated with the sequence of tokens. The tokenized data 1030 may be utilized by the network traffic classification logic 1024 to generate, for at least one packet, a high-dimensional representation.

In many embodiments, the storage 1018 can include pattern data 1032. The pattern data 1032 may relate to data representative of patterns learned by the machine learning model by application of one or more transformations to the high-dimensional representation. For example, the pattern data 1032 may include complex relationships or structures that reveal significant features of the network traffic and dependencies between packets in a sequence. In a number of embodiments, the pattern data 1032 may be utilized by the network traffic classification logic 1024 to classify the received network traffic as legitimate traffic or anomalous traffic.

In a variety of embodiments, data may be processed into a format usable by a machine learning ("ML") model 1026 (e.g., feature vectors), and/or other pre-processing techniques. The ML model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models. The ML model 1026 may be configured to analyze the tokenized data 1030 and the pattern data 1032 for adaptively classifying the network traffic associated with a new application. In various embodiments, the ML model 1026 may be utilized to identify various parameters to include in the tokenized data 1030 and the pattern data 1032. For example, the ML model 1026 may analyze the tokenized data 1030 and the pattern data 1032 and identify parameters that are required to augment the tokenized data 1030, and the pattern data 1032. Once the parameters are identified, the network traffic classification logic 1024 may utilize the parameters to perform adaptive network classification associated with a new application.

Although a specific embodiment for a device 1000 suitable for configuration with the network traffic classification logic 1024 for carrying out the various steps, processes, methods, and operations described herein is discussed with respect to FIG. 10, any of a variety of systems and/or processes may be utilized in accordance with embodiments of the disclosure. For example, the device may be implemented in a virtual environment such as a cloud-based network administration suite or a cloud computing environment, or the device may be distributed across a variety of network devices such that each acts as a device and the network traffic classification logic 1024 acts in tandem between the devices. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous," "exemplary," or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network device, comprising:

a memory configured to store a machine learning model pre-trained based on historical network traffic associated with a set of applications, wherein the machine learning model is pre-trained with contrastive learning to distinguish between a plurality of traffic types in the historical network traffic;

a processor communicatively coupled to the memory; and a network traffic classification logic configured to:

receive network traffic associated with a new application that is different from the set of applications;

extract at least one packet from the received network traffic; and classify the received network traffic as one of legitimate traffic or anomalous traffic based on the machine learning model, wherein the machine learning model, comprises an encoder and a decoder, is configured to:

learn, by using the encoder to apply one or more transformations to a high-dimensional representation of the at least one packet, one or more patterns associated with the received network traffic based on the contrastive learning; and detect, by using the decoder, whether the learned one or more patterns have a similarity greater than a threshold value with respect to a set of previously learned patterns of at least one application in the set of applications, wherein the received network traffic is classified as one of the legitimate traffic or the anomalous traffic based on the detection.

2. The network device of claim 1, wherein the network traffic classification logic is further configured to re-train the machine learning model based on one or more confirmed instances of the classification.

3. The network device of claim 1, wherein the network traffic classification logic is further configured to re-train the machine learning model based on reinforcement learning.

4. The network device of claim 1, wherein the network traffic classification logic is further configured to: convert the at least one packet into a sequence of tokens representing a plurality of features of the at least one packet; and generate, for the at least one packet, a sequence of embeddings associated with the sequence of tokens.

5. The network device of claim 4, wherein the plurality of features comprises a source address, a destination address, one or more port numbers, a packet size, one or more protocol types, one or more timestamps, and one or more bytes of a payload.

6. The network device of claim 4, wherein the encoder is configured to add a positional encoding, which identifies a position of each token in the sequence of tokens, to the sequence of embeddings.

7. The network device of claim 4, wherein the encoder comprises a multi-head attention layer configured to: receive the sequence of embeddings; and generate, for the at least one packet, the high-dimensional representation based on the sequence of embeddings.

8. The network device of claim 7, wherein the multi-head attention layer comprises a plurality of attention heads, and wherein each attention head of the plurality of attention heads is configured to generate one or more attention weights, indicating a relevance each embedding in the sequence of embeddings has with respect to each other embedding in the sequence of embeddings, and wherein the high-dimensional representation is generated based on the one or more attention weights generated by the each attention head of the plurality of attention heads.

9. The network device of claim 8, wherein the encoder further comprises a feed-forward neural network layer configured to:

receive the high-dimensional representation of the at least one packet; and apply the one or more transformations to the high-dimensional representation to learn the one or more patterns of the received network traffic, wherein the one or more transformation comprises a linear transformation and/or a non-linear transformation.

10. The network device of claim 9, wherein the decoder is configured to: receive the learned one or more patterns from the feed-forward neural network layer; and detect whether the received one or more patterns have the similarity greater than the threshold value with respect to the set of previously learned patterns of the at least one application.

11. The network device of claim 10, wherein the decoder is further configured to classify the received network traffic as the legitimate traffic based on the detection that the received one or more patterns have the similarity greater than the threshold value.

12. The network device of claim 10, wherein the decoder is further configured to classify the received network traffic as the anomalous traffic based on the detection that the received one or more patterns have the similarity less than the threshold value.

13. The network device of claim 1, wherein the new application corresponds to a zero-day application that is unknown to the machine learning model.

14. The network device of claim 1, wherein the network device is an edge device.

15. The network device of claim 14, wherein the edge device is an access point.

16. A method, comprising:

receiving a training dataset comprising historical network traffic associated with a set of applications;

training a machine learning model, based on the training dataset, comprises utilizing contrastive learning on the machine learning model, wherein, based on the contrastive learning, the machine learning model learns to distinguish between a plurality of traffic types in the historical network traffic, and based on the training and the contrastive learning, the machine learning model learns a plurality of patterns associated with the historical network traffic and attains a capability to classify network traffic associated with a new application that is different from the set of applications as one of legitimate traffic or anomalous traffic, wherein the new application corresponds to a zero-day application that is unknown to the machine learning model, and wherein classifying the network traffic associated with the new application comprises:

learning, by an encoder of the machine learning model, one or more patterns for the network traffic associated with the new application; and detecting, by a decoder of the machine learning model, whether the one or more patterns associated with the network traffic of the new application have a similarity greater than a threshold value with respect to the plurality of patterns associated with the historical network traffic;

and deploying the machine learning model for network traffic classification on an edge device.

17. A method, comprising:

running a machine learning model that is pre-trained based on historical network traffic associated with a set of applications, on an edge device, wherein the machine learning model is pre-trained with contrastive learning to distinguish between a plurality of traffic types in the historical network traffic;

receiving network traffic associated with a new application that is different from the set of applications;

extract at least one packet from the received network traffic; and classifying the received network traffic as one of legitimate traffic or anomalous traffic utilizing the machine learning model, wherein classifying the received network traffic comprises:

learning, by the machine learning model, one or more patterns associated with the received network traffic based on the contrastive learning comprises:

applying, by an encoder of the machine learning model, one or more transformations to a high-dimensional representation generated for the at least one packet to learn the one or more patterns of the received network traffic; and detecting, by a decoder of the machine learning model, whether the learned one or more patterns have a similarity greater than a threshold value with respect to a set of previously learned patterns of at least one application in the set of applications, wherein the received network traffic is classified as one of the legitimate traffic or the anomalous traffic based on the detection.

* * * * *